(12) United States Patent
Ngosi et al.

(10) Patent No.: US 8,076,907 B2
(45) Date of Patent: Dec. 13, 2011

(54) METHOD AND APPARATUS FOR EXPORTING POWER IN A RENEWABLE ENERGY SYSTEM EMPLOYING A BATTERY CHARGER

(75) Inventors: Masautso Sau Ngosi, Port Coquitlam (CA); Trevor Monk, Surrey (CA); Zoran Miletic, Burnaby (CA)

(73) Assignee: Xantrex Technology Inc., Livermore, CA (US)

( * ) Notice: Subject to any disclaimer, the term of this patent is extended or adjusted under 35 U.S.C. 154(b) by 798 days.

(21) Appl. No.: 12/222,296

(22) Filed: Aug. 6, 2008

(65) Prior Publication Data

US 2010/0033124 A1    Feb. 11, 2010

(51) Int. Cl.
*H01M 10/44* (2006.01)
*H01M 10/46* (2006.01)
(52) U.S. Cl. ........................................ 320/160
(58) Field of Classification Search .................. 320/107, 320/128, 130, 132, 150, 160
See application file for complete search history.

(56) References Cited

U.S. PATENT DOCUMENTS

| 5,583,413 | A | * | 12/1996 | Proctor et al. | 320/134 |
| 5,939,855 | A | * | 8/1999 | Proctor et al. | 320/104 |
| 7,091,707 | B2 | | 8/2006 | Cutler | |
| 2008/0111517 | A1 | * | 5/2008 | Pfeifer et al. | 320/101 |

OTHER PUBLICATIONS

Trojan Battery Company. Aug. 6, 2008 <http://www.trojanbattery.com/BatteryMaintenance/Charging.aspx>.
"Charging the lead-acid battery." BatteryUniversity.com. 2003. Jul. 31, 2008 <http://batteryuniversity.com/partone-13.htm>.
"Battery Tutorial." BatteryStuff.com. Aug. 6, 2008 <http://batterystuff.com/tutorial_battery.html>.
"FLEXmax™80 User's Guide." OutBack Power Systems™.
"Smart Power™ M5 Plus Power Conversion System Installation & Operation Manual." Beacon POWER™. Mar. 24, 2006.
PSI Sinewave Interactive Inverter Charger Technical Manual. Selectronic. 2006.

* cited by examiner

*Primary Examiner* — Edward Tso
(74) *Attorney, Agent, or Firm* — Nixon Peabody LLP

(57) ABSTRACT

A method of charging a battery in a system involving a renewable energy source and operable to supply at least some electrical energy from the renewable energy source to a third party involves causing a charge controller operably connected to the renewable energy source to receive the electrical energy from the renewable energy source and operably connected to the battery, to charge the battery, using only the electrical energy from the renewable energy source, according to a charging sequence. The charging sequence includes at least a bulk charge period wherein the battery is charged at a relatively constant charging current, an absorption period following the bulk charge period wherein the battery is charged in an absorption mode, and a float period following the absorption period wherein the battery is charged in a float charging mode.

60 Claims, 15 Drawing Sheets

COMMUNICATION INTERFACE

METHOD AND APPARATUS FOR EXPORTING POWER IN A RENEWABLE ENERGY SYSTEM EMPLOYING A BATTERY CHARGER

BACKGROUND OF THE INVENTION

1. Field of Invention

This invention relates to exporting power in a renewable energy system employing a battery charger, and more particularly to effecting a charge sequence in such system, wherein adherence to the charge sequence determines the amount of power to be exported.

2. Description of Related Art

Because electrical utility service can sometimes fail, it may be desirable to equip a home or other electrical utility usage site with a source of backup electrical power. The source of backup electrical power may be one or more batteries, such as lead acid batteries, for example.

In some systems, a renewable energy source, such as a photovoltaic panel or array for example, may be used to charge the batteries. In these systems, the renewable energy source may generate more energy than is required to charge the batteries, and therefore some of the generated energy may be exported to the electrical utility service, potentially reducing a user's electrical utility charges.

However, it has been found that these systems may export energy to the electrical utility service in a manner that does not enable a battery charger to apply preferable charge cycles to the batteries. The charge cycles applied to batteries in some backup electrical power systems may, for example, lead to accelerated corrosion or sulfation of plates in the batteries, and may result in premature loss of electrolytes in the batteries.

SUMMARY OF THE INVENTION

In accordance with one aspect of the invention, there is provided a method of charging a battery in a system involving a renewable energy source and operable to supply at least some electrical energy from the renewable energy source to a third party. The method involves causing a charge controller operably connected to the renewable energy source to receive the electrical energy from the renewable energy source and operably connected to the battery, to charge the battery, using only the electrical energy from the renewable energy source, according to a charging sequence. The charging sequence includes at least a bulk charge period wherein the battery is charged at a relatively constant charging current, an absorption period following the bulk charge period wherein the battery is charged in an absorption mode, and a float period following the absorption period wherein the battery is charged in a float charging mode. The method further involves: producing a charger current value representing current supplied by the charge controller; producing a battery voltage value representing a battery voltage; causing the charge controller to transmit an indication of the current period of the charging sequence and a reference voltage value associated with the current period of the charging sequence, to an inverter operably connected to the charge controller and the battery to receive electrical energy therefrom; causing the inverter to draw current from the charge controller to supply electrical energy to the third party, without drawing sufficient current to load the charge controller to a point where the battery voltage value drops below a target voltage dependent on the reference voltage value, when the charge controller indicates the absorption period or the float period is in progress; causing the charge controller to set the indication of the current period of the charging sequence to indicate that the current period of the charging sequence is the absorption period and causing the charge controller to set the reference voltage to correspond to an absorption voltage of the battery, when the battery voltage value meets a bulk charge exit criterion; producing an inverter current value representing the current drawn by the inverter; transmitting the inverter current value to the charge controller; and causing the charge controller to set the indication of the current period of the charging sequence to indicate that the current period of the charging sequence is the float period and causing the charge controller to set the reference voltage to correspond to a float voltage of the battery less than the absorption voltage of the battery, when the charger current value and the inverter current value meet absorption period exit criteria.

The method may also involve causing the inverter to draw no current from the charge controller when the bulk charge period is in progress.

The method may further involve producing the reference voltage value and producing the target voltage.

Producing the reference voltage value may involve producing a temperature-compensated manufacturer's recommended absorption voltage value in response to a temperature of the battery and a manufacturer's recommended absorption voltage value and using the temperature-compensated manufacturer's recommended absorption voltage value as the reference voltage value.

Producing the target voltage may involve producing a reduced temperature-compensated manufacturer's recommended absorption voltage value in response to the temperature-compensated manufacturer's recommended absorption voltage value and using the reduced temperature-compensated manufacturer's recommended absorption voltage value as the target voltage.

Producing the reduced temperature-compensated manufacturer's recommended absorption voltage value may involve subtracting about 1% to about 5% from the temperature-compensated manufacturer's recommended absorption voltage value.

Producing the reference voltage value may also involve producing a temperature-compensated manufacturer's recommended float voltage value in response to a temperature of the battery and a manufacturer's recommended float voltage value and using the temperature-compensated manufacturer's recommended float voltage value as the reference voltage value.

Producing the target voltage may further involve producing a reduced temperature-compensated manufacturer's recommended float voltage value in response to the temperature-compensated manufacturer's recommended float voltage value and using the reduced temperature-compensated manufacturer's recommended float voltage value as the target voltage.

Producing the reduced temperature-compensated manufacturer's recommended float voltage value may involve subtracting about 1% to about 5% from the temperature-compensated manufacturer's recommended float voltage value.

The bulk charge exit criterion may be met when the battery voltage value equals or exceeds a bulk period exit voltage value.

The method may also involve producing the bulk period exit voltage value.

Producing the bulk period exit voltage value may involve using a temperature compensated manufacturer's recommended absorption voltage value as the bulk period exit voltage value.

The absorption period exit criteria may be met when a difference between the charger current value and the inverter current value is less than an absorption current exit value or when the absorption period has been in progress for a time exceeding an absorption timeout value.

The absorption current exit value may be between 1% and 5% of an amp-hour rating of the battery.

The charge controller and the inverter may independently measure the battery voltage and produce respective battery voltage values for their respective uses.

The charge controller may include a plurality of charge controllers in communication with each other, and one of the charge controllers of the plurality of charge controllers may be a primary charge controller that is designated to be the only one that transmits the indication of the current period of the charging sequence and the reference voltage value to the inverter, in response to charger current values received from all charge controllers of the plurality of charge controllers and the inverter current value, received from the inverter.

The inverter may include a plurality of inverters in communication with the charge controller, each inverter being operably connected to the charge controller and the battery to receive electrical energy therefrom and configured to: draw no current from the charge controller when the bulk charge period is in progress; draw current from the charge controller to supply electrical energy to the third party, without drawing sufficient current to load the charge controller to a point where the battery voltage value drops below the target voltage, when the charge controller indicates the absorption period or the float period is in progress; produce an inverter current value representing the current drawn by the inverter; and transmit the inverter current value to the charge controller.

The charge controller may include a plurality of charge controllers and the inverter may include a plurality of inverters, and the charge controllers may be in communication with each other and with the inverters and one of the charge controllers of the plurality of charge controllers may be a primary charge controller, and each inverter may be operably connected to the charge controllers and the battery to receive electrical energy therefrom. The method may also involve causing the primary charge controller to be the only one that transmits the indication of the current period of the charging sequence and the reference voltage value, and causing each inverter to: draw no current from the plurality of charge controllers when the bulk charge period is in progress; draw current from the plurality of charge controllers to supply electrical energy to the third party, without drawing sufficient current to load the charge controller to a point where the battery voltage value drops below the target voltage, when the primary charge controller indicates the absorption period or the float period is in progress; produce an inverter current value representing the current drawn by the inverter; and transmit the inverter current value to the primary charge controller. The method may also involve: receiving the inverter current values at the primary charge controller; receiving at the primary charge controller charger current values from all of the plurality of charge controllers; and causing the primary charge controller to set the indication of the current period of the charging sequence to indicate that the current period of the charging sequence is the float period and to set the reference voltage value to correspond to a float voltage of the battery less than the absorption voltage of the battery, when the charger current values and the inverter current values meet absorption period exit criteria.

The absorption period exit criteria may be met when a difference between a sum of the charger current values and a sum of the inverter current values is less than an absorption current exit value or when the absorption period has been in progress for a time exceeding an absorption timeout value.

In accordance with another aspect of the invention, there is provided an apparatus for charging a battery in a system including a renewable energy source and operable to supply at least some electrical energy from the renewable energy source to a third party. The apparatus includes charging provisions for charging the battery, using only the electrical energy from the renewable energy source, according to a charging sequence, wherein the charging provisions are operably connected to the renewable energy source to receive the electrical energy from the renewable energy source and operably connected to the battery to charge the battery. The charging sequence includes at least a bulk charge period wherein the battery is charged at a relatively constant charging current, an absorption period following the bulk charge period wherein the battery is charged in an absorption mode, and a float period following the absorption period wherein the battery is charged in a float charging mode. The apparatus also includes: provisions for producing a charger current value representing current supplied by the charging provisions to the battery; provisions for producing a battery voltage value representing a battery voltage; and receiving provisions operably connected to the charging provisions and the battery for receiving electrical energy therefrom. The charging provisions are operably configured to transmit an indication of the current period of the charging sequence and a reference voltage value associated with the current period of the charging sequence, to the receiving provisions, and the receiving provisions are operably configured to: receive current from the charging provisions to supply electrical energy to the third party, without drawing sufficient current to load the charging provisions to a point where the battery voltage value drops below a target voltage dependent on the reference voltage value, when the charging provisions indicates the absorption period or the float period is in progress; and transmit to the charging provisions a received current value representing the current received by the receiving provisions. The charging provisions are operably configured to: set the indication of the current period of the charging sequence to indicate that the current period of the charging sequence is the absorption period and to set the reference voltage to correspond to an absorption voltage of the battery, when the battery voltage value meets a bulk charge exit criterion; and set the indication of the current period of the charging sequence to indicate that the current period of the charging sequence is the float period and to set the reference voltage to correspond to a float voltage of the battery less than the absorption voltage of the battery, when the charger current value and the received current value meet absorption period exit criteria.

The receiving provisions may include a processor circuit operably configured to cause the receiving provisions to receive no current from the charging provisions when the bulk charge period is in progress.

The system may also include provisions for producing the reference voltage value and provisions for producing the target voltage.

The provisions for producing the reference voltage value may also include a first processor circuit operably configured to produce a temperature-compensated manufacturer's recommended absorption voltage value in response to a temperature of the battery and a manufacturer's recommended absorption voltage value, and to use the temperature-compensated manufacturer's recommended absorption voltage value as the reference voltage value.

The provisions for producing the target voltage may further include a second processor circuit operably configured to produce a reduced temperature-compensated manufacturer's recommended absorption voltage value in response to the temperature-compensated manufacturer's recommended absorption voltage value, and to use the reduced temperature-compensated manufacturer's recommended absorption voltage value as the target voltage.

The second processor circuit may be operably configured to produce the reduced temperature-compensated manufacturer's recommended absorption voltage value by subtracting about 1% to about 5% from the temperature-compensated manufacturer's recommended absorption voltage value.

The provisions for producing the reference voltage value may include a first processor circuit operably configured to produce a temperature-compensated manufacturer's recommended float voltage value in response to a temperature of the battery and a manufacturer's recommended float voltage value, and to use the temperature-compensated manufacturer's recommended float voltage value as the reference voltage value.

The provisions for producing the target voltage may further include a second processor circuit operably configured to produce a reduced temperature-compensated manufacturer's recommended float voltage value in response to the temperature-compensated manufacturer's recommended float voltage value, and to use the reduced temperature-compensated manufacturer's recommended float voltage value as the target voltage.

The second processor circuit may be operably configured to produce the reduced temperature-compensated manufacturer's recommended float voltage value by subtracting about 1% to about 5% from the temperature-compensated manufacturer's recommended float voltage value.

The bulk charge exit criterion may be met when the battery voltage value equals or exceeds a bulk period exit voltage value.

The system may also include provisions for producing the bulk period exit voltage value.

The provisions for producing the bulk period exit voltage value may further include a processor circuit operably configured to use a temperature compensated manufacturer's recommended absorption voltage value as the bulk period exit voltage value.

The absorption period exit criteria may be met when a difference between the charger current value and the received current value is less than an absorption current exit value or when the absorption period has been in progress for a time exceeding an absorption timeout value.

The absorption current exit value may be between 1% and 5% of an amp-hour rating of the battery.

The charging provisions and the receiving provisions may independently measure the battery voltage and produce respective battery voltage values for their respective uses.

The charging provisions may include a plurality of charging provisions in communication with each other, and one of the charging provisions of the plurality of charging provisions may be a primary charging provisions that is designated to be the only one that transmits the indication of the current period of the charging sequence and the reference voltage value to the receiving provisions, in response to charger current values received from all charging provisions of the plurality of charging provisions and the received current value, received from the receiving provisions.

The receiving provisions may include a plurality of receiving provisions in communication with the charging provisions, each receiving provisions being operably connected to the charging provisions and the battery to receive electrical energy therefrom and configured to: receive no current from the charging provisions when the bulk charge period is in progress; receive current from the charging provisions to supply electrical energy to the third party, without drawing sufficient current to load the charging provisions to a point where the battery voltage value drops below the target voltage, when the charging provisions indicate the absorption period or the float period is in progress; produce a received current value representing the current drawn by the receiving provisions; and transmit the received current value to the charging provisions.

The charging provisions may include a plurality of charging provisions and the receiving provisions may include a plurality of receiving provisions. The plurality of charging provisions may be in communication with each other and with the plurality of receiving provisions and one of the charging provisions of the plurality of charging provisions may be a primary charging provisions, and each receiving provisions of the plurality of receiving provisions may be operably connected to each charging provisions of the plurality of charging provisions and the battery to receive electrical energy therefrom. The primary charging provisions may be the only one that transmits the indication of the current period of the charging sequence and the reference voltage value, and each of the receiving provisions may be operably configured to: receive no current from the plurality of charging provisions when the bulk charge period is in progress; receive current from the plurality of charging provisions to supply electrical energy to the third party, without drawing sufficient current to load the charging provisions to a point where the battery voltage value drops below the target voltage, when the primary charging provisions indicates the absorption period or the float period is in progress; produce a received current value representing the current drawn by the receiving provisions; and transmit the received current value to the primary charging provisions. The primary charging provisions may be operably configured to receive the received current values, and to receive charger current values from all of the plurality of charging provisions, and the primary charging provisions may be operably configured to set the indication of the current period of the charging sequence to indicate that the current period of the charging sequence is the float period and to set the reference voltage value to correspond to a float voltage of the battery less than the absorption voltage of the battery, when the charger current values and the received current values meet absorption period exit criteria.

The absorption period exit criteria may be met when a difference between a sum of the charger current values and a sum of the received current values is less than an absorption current exit value or when the absorption period has been in progress for a time exceeding an absorption timeout value.

In accordance with another aspect of the invention, there is provided an apparatus for charging a battery in a system including a renewable energy source and operable to supply at least some electrical energy from the renewable energy source to a third party. The apparatus includes a charge controller for charging the battery, using only the electrical energy from the renewable energy source, according to a charging sequence, wherein the charge controller is operably connected to the renewable energy source to receive the electrical energy from the renewable energy source and operably connected to the battery to charge the battery, and the charging sequence includes at least: a bulk charge period wherein the battery is charged at a relatively constant charging current; an absorption period following the bulk charge period wherein the battery is charged in an absorption mode; and a float period following the absorption period wherein the battery is charged in a float charging mode. The apparatus also includes: a current measuring device in communication with the charge controller and operably configured to produce a charger current value representing current supplied by the charge controller to the battery; a voltage measuring device in communication with the charge controller and operably configured to produce a battery voltage value representing a battery voltage; and an inverter operably connected to the charge controller and the battery for receiving electrical energy therefrom, and in communication with the charge controller and the voltage measuring device to receive the battery voltage value therefrom. The charge controller includes a first transmitter operably configured to transmit an indication of the current period of the charging sequence and a reference voltage value associated with the current period of the charging sequence, to the inverter. The inverter is operably configured to receive current from the charge controller to supply electrical energy to the third party, without drawing sufficient current to load the charge controller to a point where the battery voltage value drops below a target voltage dependent on the reference voltage value, when the charge controller indicates the absorption period or the float period is in progress. The inverter includes a second transmitter operably configured to transmit to the charge controller an inverter current value representing the current received by the inverter, and the charge controller is operably configured to: set the indication of the current period of the charging sequence to indicate that the current period of the charging sequence is the absorption period and to set the reference voltage to correspond to an absorption voltage of the battery, when the battery voltage value meets a bulk charge exit criterion; and set the indication of the current period of the charging sequence to indicate that the current period of the charging sequence is the float period and to set the reference voltage to correspond to a float voltage of the battery less than the absorption voltage of the battery, when the charger current value and the inverter current value meet absorption period exit criteria.

The inverter may be operably configured to receive no current from the charge controller when the bulk charge period is in progress The charge controller may include a first processor circuit operably configured to produce the reference voltage value, and the inverter may include a second processor circuit operably configured to produce the target voltage.

The first processor circuit may be operably configured to produce a temperature-compensated manufacturer's recommended absorption voltage value in response to a temperature of the battery and a manufacturer's recommended absorption voltage value, and to use the temperature-compensated manufacturer's recommended absorption voltage value as the reference voltage value.

The second processor circuit may be operably configured to produce a reduced temperature-compensated manufacturer's recommended absorption voltage value in response to the temperature-compensated manufacturer's recommended absorption voltage value, and to use the reduced temperature-compensated manufacturer's recommended absorption voltage value as the target voltage.

The second processor circuit may be operably configured to produce the reduced temperature-compensated manufacturer's recommended absorption voltage value by subtracting about 1% to about 5% from the temperature-compensated manufacturer's recommended absorption voltage value.

The first processor circuit may be operably configured to produce a temperature-compensated manufacturer's recommended float voltage value in response to a temperature of the battery and a manufacturer's recommended float voltage value, and to use the temperature-compensated manufacturer's recommended float voltage value as the reference voltage value.

The second processor circuit may be operably configured to produce a reduced temperature-compensated manufacturer's recommended float voltage value in response to the temperature-compensated manufacturer's recommended float voltage value, and to use the reduced temperature-compensated manufacturer's recommended float voltage value as the target voltage.

The second processor circuit may be operably configured to produce the reduced temperature-compensated manufacturer's recommended float voltage value by subtracting about 1% to about 5% from the temperature-compensated manufacturer's recommended float voltage value.

The bulk charge exit criterion may be met when the battery voltage value equals or exceeds a bulk period exit voltage value.

The charge controller may include a processor circuit operably configured to produce the bulk period exit voltage value.

The processor circuit may be operably configured to use a temperature compensated manufacturer's recommended absorption voltage value as the bulk period exit voltage value.

The absorption period exit criteria may be met when a difference between the charger current value and the inverter current value may be less than an absorption current exit value or when the absorption period has been in progress for a time exceeding an absorption timeout value.

The absorption current exit value may be between 1% and 5% of an amp-hour rating of the battery.

The charge controller and the inverter may independently measure the battery voltage and produce respective battery voltage values for their respective uses.

The charge controller may include a plurality of charge controllers in communication with each other and one of the charge controllers of the plurality of charge controllers may be a primary charge controller that is designated to be the only one that transmits the indication of the current period of the charging sequence and the reference voltage value to the inverter, in response to charger current values received from all charge controllers of the plurality of charge controllers and the inverter current value, received from the inverter.

The inverter may include a plurality of inverters in communication with the charge controller, each inverter being operably connected to the charge controller and the battery to receive electrical energy therefrom and configured to: receive no current from the charge controller when the bulk charge period is in progress; receive current from the charge controller to supply electrical energy to the third party, without drawing sufficient current to load the charge controller to a point where the battery voltage value drops below the target voltage, when the charge controller indicates the absorption period or the float period is in progress; produce an inverter current value representing the current drawn by the inverter; and transmit the inverter current value to the charge controller.

The charge controller may include a plurality of charge controllers and the inverter may include a plurality of inverters, wherein the plurality of charge controllers are in communication with each other and with the plurality of inverters and wherein one of the charge controllers of the plurality of charge controllers is a primary charge controller, and wherein each inverter of the plurality of inverters is operably connected to each charge controller of the plurality of charge controllers and the battery to receive electrical energy therefrom. The primary charge controller may be the only one that transmits the indication of the current period of the charging sequence and the reference voltage value, and each inverter may be operably configured to: receive no current from the plurality of charge controllers when the bulk charge period is in progress; receive current from the plurality of charge controllers to supply electrical energy to the third party, without drawing sufficient current to load the charge controller to a point where the battery voltage value drops below the target voltage, when the primary charge controller indicates the absorption period or the float period is in progress; produce an inverter current value representing the current drawn by the inverter; and transmit the inverter current value to the primary charge controller. The primary charge controller may be operably configured to receive the inverter current values, and to receive charger current values from all of the plurality of charge controllers. The primary charge controller may be operably configured to set the indication of the current period of the charging sequence to indicate that the current period of the charging sequence is the float period and to set the reference voltage value to correspond to a float voltage of the battery less than the absorption voltage of the battery, when the charger current values and the inverter current values meet absorption period exit criteria.

The absorption period exit criteria may be met when a difference between a sum of the charger current values and a sum of the inverter current values is less than an absorption current exit value or when the absorption period has been in progress for a time exceeding an absorption timeout value.

In accordance with another aspect of the invention, there is provided a method of charging at least one battery in a system including at least one renewable energy source and operable to supply at least some electrical energy from the at least one renewable energy source to a third party. The method involves associating charge controllers and inverters of the system into groups and associating the groups with at least one respective battery, wherein each group comprises at least one charge controller and at least one inverter, and wherein each charge controller is operably connected to the renewable energy source to receive the electrical energy from the renewable energy source and operably connected to the at least one associated battery, to charge the at least one associated battery, using only the electrical energy from the renewable energy source, and wherein each inverter is operably connected to at least one charge controller in a same group and to the at least one associated battery to receive electrical energy therefrom. The method also involves causing all of the charge controllers and inverters in each group to communicate with other charge controllers and inverters in the same group, causing one charge controller in the group to be identified as a group primary charge controller, and causing each of the at least one charge controller in a common group to: produce a charger current value representing current supplied by that charge controller; produce a battery voltage value representing the voltage of the at least one battery associated with the common group; and transmit the charger current value and the battery voltage value to the group primary charge controller of the common group. The method also involves causing the at least one charge controller in the common group to supply a battery charging current to the at least one battery associated with the common group, according to a charging sequence associated with the common group, the charging sequence inclosing at least: a bulk charge period wherein the at least one battery associated with the common group is charged at a relatively constant charging current; an absorption period following the bulk charge period wherein the at least one battery associated with the common group is charged in an absorption charging mode; and a float period following the absorption period wherein the at least one battery associated with the common group is charged in a float charging mode. The method also involves causing the group primary charge controller of the common group to transmit an indication of the current period of the charging sequence associated with the common group and a reference voltage associated with the current period of the charging sequence associated with the common group, to the at least one inverter in the common group. The method also involves, when the group primary charge controller of the common group indicates the absorption period or the float period is in effect, causing each of the at least one inverter in the common group to: measure a battery voltage value of the at least one battery associated with the common group; draw current from the at least one charge controller in the common group without drawing sufficient current to load the at least one charge controller of the common group to a point where the battery voltage value measured by that inverter drops below a target voltage dependent on the reference voltage associated with the current period of the charging sequence associated with the common group, wherein the current drawn from the at least one charge controller in the common group is provided to the third party; measure the current drawn by that inverter; and transmit to the group primary charge controller of the common group, an inverter current value representing current drawn by that inverter. The method also involves causing the group primary charge controller of the common group to set the indication of the current period of the charging sequence associated with the common group to indicate that the current period of the charging sequence associated with the common group is the absorption period; causing the group primary charge controller of the common group to set the reference voltage associated with the current period of the charging sequence associated with the common group to correspond to an absorption voltage of the at least one battery associated with the common group, when at least one of the charge controllers in the common group transmits to the group primary charge controller of the common group a battery voltage value that meets a bulk period exit criterion; and causing the group primary charge controller of the common group to set the indication of the current period of the charging sequence associated with the common group to indicate that the current period of the charging sequence associated with the common group is the float period and causing the group primary charge controller of the common group to set the reference voltage associated with the current period of the charging sequence associated with the common group to correspond to a float voltage of the at least one battery associated with the common group, the float voltage of the at least one battery associated with the common group being less than the absorption voltage of the at least one battery associated with the common group, when the charger current values of the at least one charge controller of the common group and the inverter current values of the at least one inverter of the common group meet absorption period exit criteria.

The method may also involve, when the group primary charge controller of the common group indicates the bulk period is in effect, causing each of the at least one inverter in the common group to draw no current from the at least one charge controller in the common group.

Associating the charge controllers and the inverters of the system into groups involving receiving programming values at each of the charge controllers and inverters, the programming values identifying the group with which respective charge controllers and inverters are to be associated.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
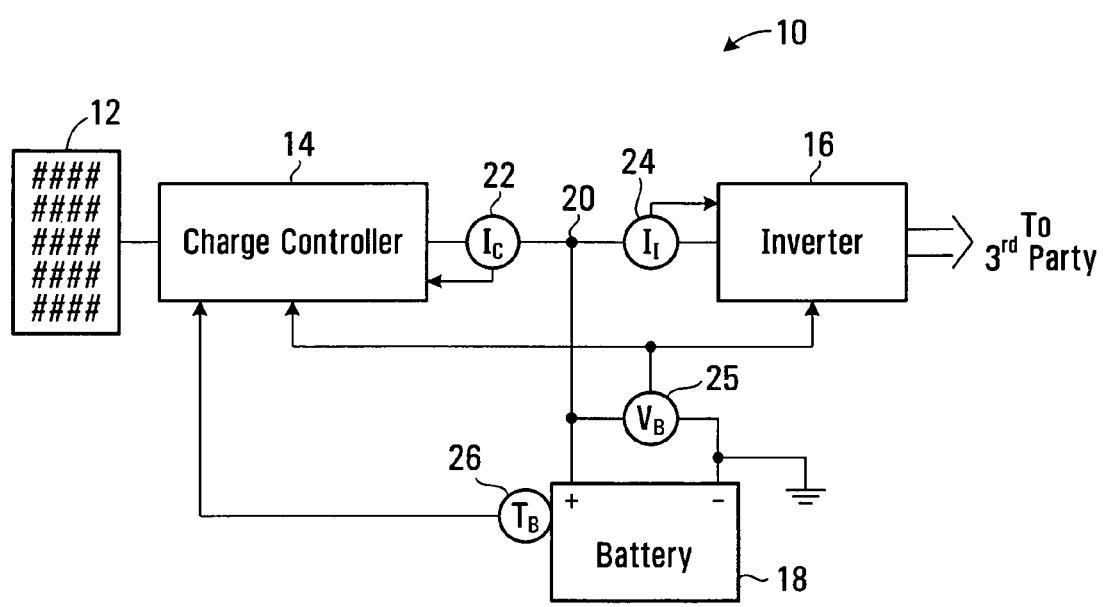
FIG. 1 is a system according to a first embodiment of the invention for charging a battery using renewable energy.

Referring to FIG. 1, an apparatus for charging a battery in a system comprising a renewable energy source and operable to supply at least some of the electrical energy from the renewable source to a third party is shown generally at 10. As stated, the system 10 includes a renewable energy source 12 which, in this embodiment, is a photovoltaic (PV) array. The system 10 further includes a charge controller 14, an inverter 16, and a battery 18. The renewable energy source 12 is connected to the charge controller 14 to supply power thereto, and the charge controller supplies electrical power to the battery 18 and to the inverter 16. The charge controller 14, battery 18, and inverter 16 are thus all connected to a common bus 20.

In this embodiment, the system 10 includes a first current measuring device 22 connected to the charge controller 14 for measuring output current $I_C$ from the charge controller. In addition, the system 10 includes a second current measuring device 24 connected to an input of the inverter 16, for measuring current $I_I$ drawn from the bus 20 by the inverter 16. The system 10 further includes a battery voltage measuring device 25 connected across terminals of the battery 18 to measure the voltage of the battery and provide to the charge controller 14 and to the inverter 16 a battery voltage value $V_B$ representing battery voltage. The system 10 further includes a temperature sensing device 26 operable to measure a temperature of the battery 18 and provide a temperature measurement value $T_B$ to the charge controller 14.

Figure 2A:
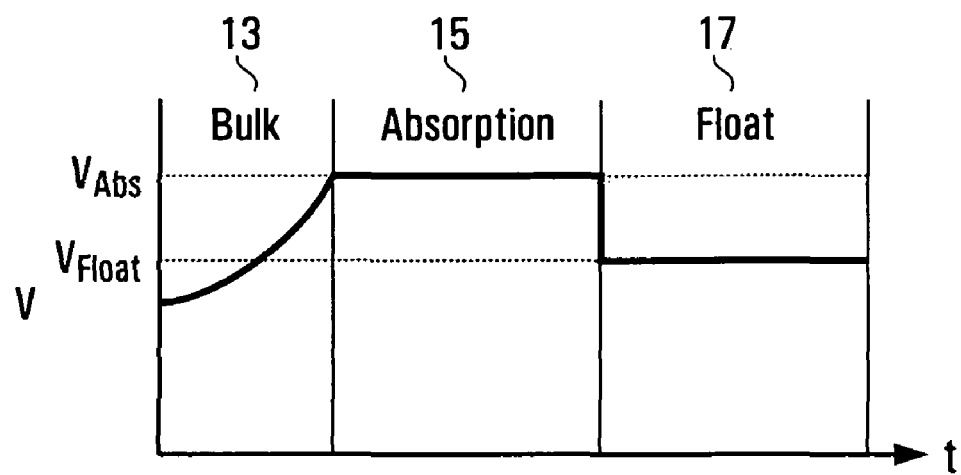
FIG. 2A is a graphical representation of voltage characteristics of a charge sequence comprising a bulk, absorption, and float period.
Figure 2B:
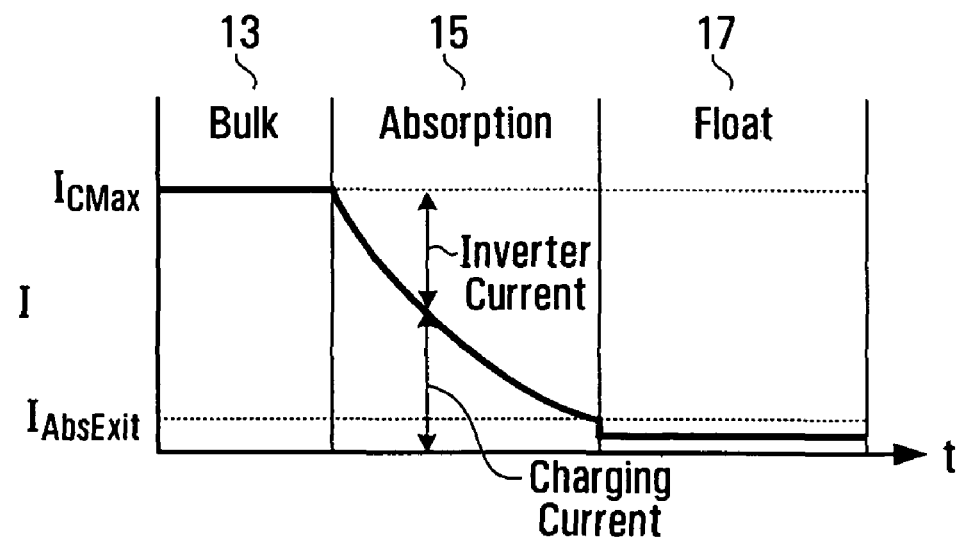
FIG. 2B is a graphical representation of current characteristics of the charge sequence shown in FIG. 2A.

The system 10 is configured such that the charge controller 14 receives electrical energy from the renewable energy source 12, in this embodiment the PV array, and uses only this renewable energy to charge the battery 18 according to a charging sequence comprising a bulk charge period 13, an absorption period 15, and a float period 17, as shown in FIG. 2. Referring to FIGS. 1 and 2, the charge controller 14 transmits an indication of the current period of the charging sequence, and a reference voltage value $V_{Ref}$ associated with the current period of the charging sequence, to the inverter 16. When the charging sequence is in the bulk charge period 13, the inverter 16 draws no current from the charge controller 14, so that all of the available current is supplied and used to charge the battery 18. However, when the charging sequence is in the absorption period 15 or the float period 17, the inverter 16 draws current from the charge controller 14 to supply electrical energy to the third party without drawing sufficient current to load the charge controller to a point where the battery voltage $V_B$ measured by the battery voltage measuring device 25 drops below a target voltage that is dependent on the reference voltage value $V_{Ref}$.

The charge controller 14 determines which period shall be in effect and determines the reference voltage value $V_{Ref}$, in response to measurements of the battery voltage $V_B$ measured by the battery voltage measuring device 25 and current provided to the battery 18 for charging. The result is that the battery 18 has priority over the inverter 16 for receiving current from the charge controller 14, and the inverter 16 is only allowed to draw as much current as it can without dragging down the voltage output of the charge controller, such that the charge controller maintains its output voltage, and hence the voltage applied to the battery, to provide charging current to the battery, as required to cause the battery to be charged according to the aforementioned charging sequence. Thus, the battery 18 is charged in an optimum way, which extends its life and reliability.

Figure 3:
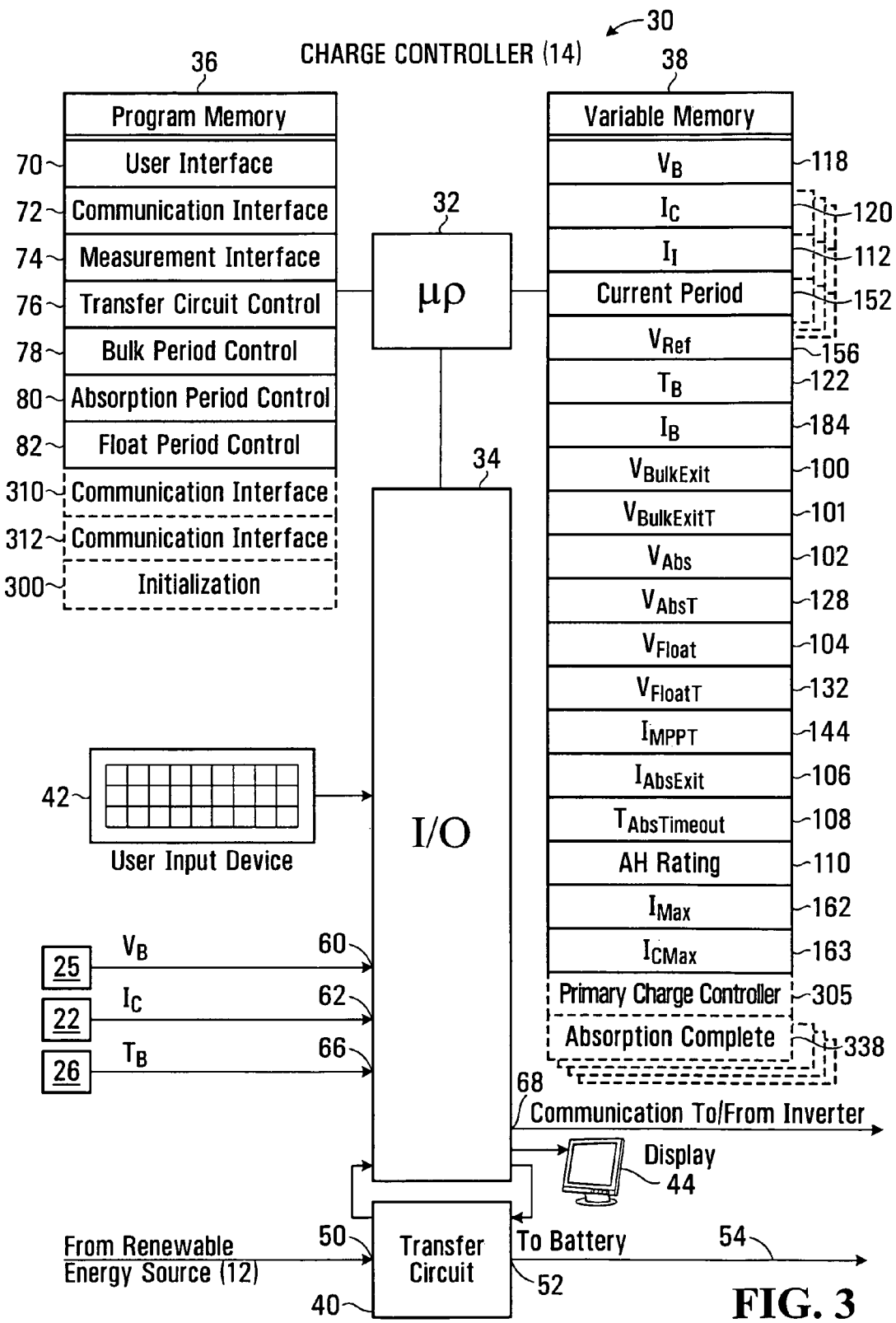
FIG. 3 is a block diagram of a charge controller shown in FIG. 1.

Referring to FIG. 3, the charge controller (14) includes a processor circuit such as shown generally at 30. The processor circuit 30 includes a processor 32, an input/output (I/O) device 34, program memory 36, variable memory 38, a transfer circuit 40, a user input device 42, and a display 44. The transfer circuit 40 has an input 50 for receiving electrical energy from the renewable energy source (12). The transfer circuit 40 also has an output 52 that is connected to a positive rail 54 of the bus 20 shown in FIG. 1. The transfer circuit 40 may comprise switching transistors (not shown) and a controller therefor (not shown) for controlling the flow of current received at the input 50 to the output 52. The transfer circuit 40 is connected to the I/O device 34 to provide information to the processor 32 including present voltage and current measurements of the electrical energy received from the renewable energy source (12), and for receiving control commands from the processor to cause the controller that controls the switching transistors to regulate the flow of energy between the input 50 and the output 52 in accordance with commands issued by the processor 32.

In the embodiment shown, the user input device 42 may be a simple keyboard, and the display 44 may be a simple LCD display or computer type display or any other annunciation means for annunciating to a user, status information relating to user input or operating state of the charge controller (14), for example.

The I/O device 34 has a plurality of inputs including a battery voltage $V_B$ input 60, a charger current value $I_C$ input 62, and a battery temperature value $T_B$ input 66. The I/O device 34 also has a bidirectional input/output 68 in this embodiment, which provides for communication to and from the inverter (16). The bidirectional input/output 68 may facilitate connection of the charge controller (14) to a network (not shown), for example, such that communications to and from the inverter (16) are conducted on the network. Alternatively, the bidirectional input/output 68 may be as simple as an RS-232 interface, for example.

The battery voltage value $V_B$ input 60 is operable to receive from the voltage measuring device 25 shown in FIG. 1, a digital value representing measured battery voltage $V_B$. Alternatively, a separate voltage measuring device similar to the one shown at 25 in FIG. 1 may be connected to the charge controller (14) for independent battery voltage value measurement, independent from battery voltage measurements taken by or for the inverter 16, for example.

Referring to FIGS. 1 and 3, the charger current value $I_C$ input 62 is operable to receive a charger current value $I_C$ representing current provided by the charge controller. The charger current value $I_C$ is provided by the first current measuring device 22 which is shown outside the charge controller 14 in FIG. 1, but of course which may be integrated within the charge controller. The charger current value $I_c$ input 62 is operable to receive a current value input from the first current measuring device 22.

The battery temperature $T_B$ input 66 is operable to receive a battery temperature value $T_B$ from the temperature sensing device 26 that measures the temperature of the battery 18.

In the embodiment shown, the program memory 36 includes a user interface 70, a communication interface 72, a measurement interface 74, a transfer circuit control process 76, a bulk period control process 78, an absorption period control process 80, and a float period control process 82. In some embodiments, such as the system 280 illustrated in FIG. 14 for example, the program memory 36 may further include an initialization process 300 and additional communication interfaces 310 and 312. However, the initialization process 300 and the additional communication interfaces 310 and 312 are illustrated with dotted lines in FIG. 3 to emphasize that they are preferable in an alternative embodiment described below.

Figure 4:
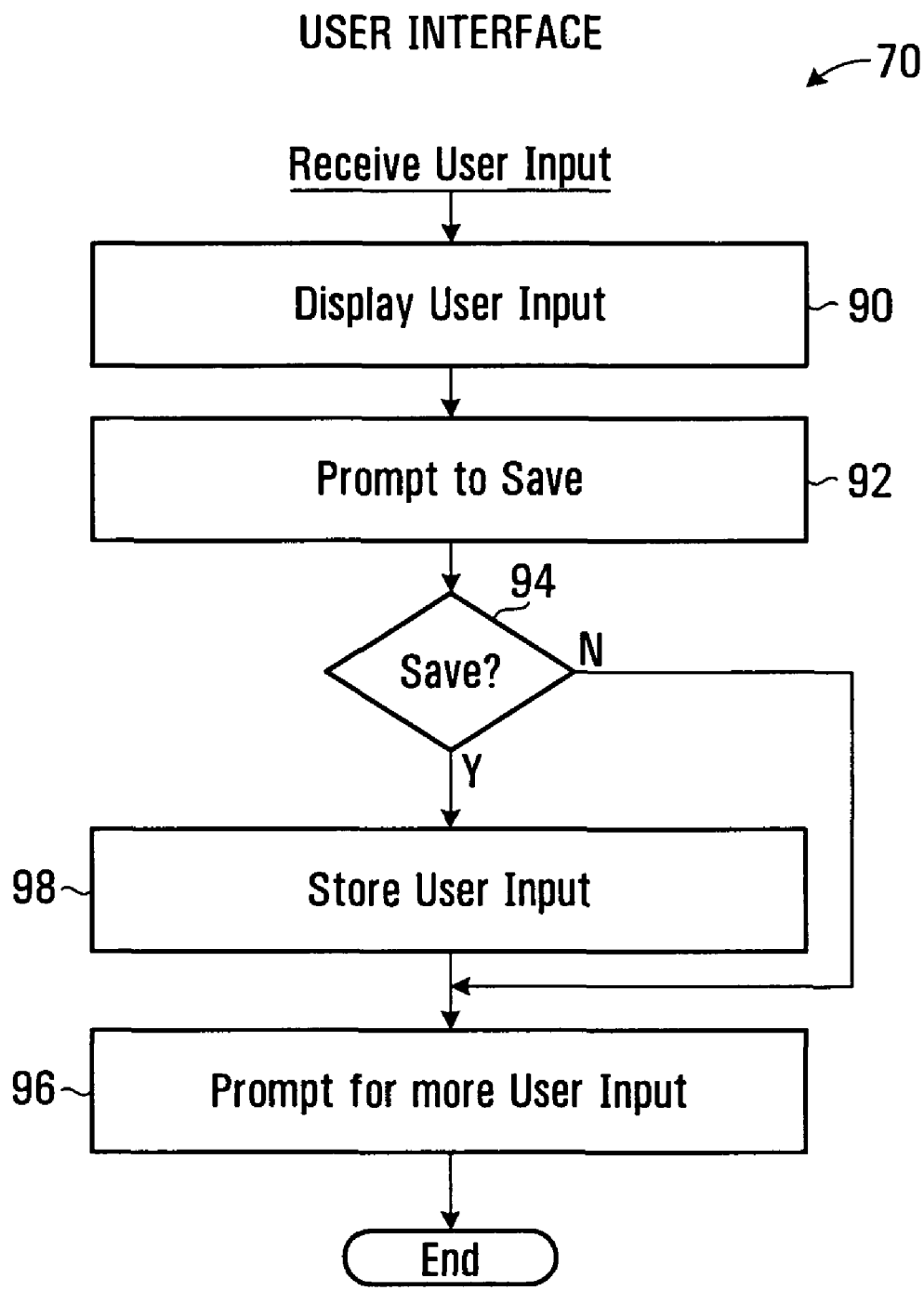
FIG. 4 is a flow chart of a user interface process executed by the charge controller shown in FIG. 3.

Referring to FIGS. 3 and 4, the user interface is shown in greater detail at 70. The user interface 70 is actuated upon receiving an interrupt from the I/O device 34 in response to user input received at the user input device 42. The first step in the user interface process is shown at 90 and directs the processor 32 to cause any user input to be displayed on the display 44 shown in FIG. 3.

Next, block 92 directs the processor 32 to prompt the user to save the current entry. This is done by providing a message on the display 44 and then awaiting input. Awaiting the input is shown at block 94, and if the user decides not to save the recently inputted values, the processor 32 is directed to block 96, which causes the processor to provide another prompt on the display 44. If the user does decide to save the input, block 98 directs the processor 32 to store the input in an appropriate location in the variable memory 38.

For example, the user interface 70 may be used to enter a bulk period exit voltage ($V_{BulkExit}$) and store it in a corresponding memory such as shown at 100. Similarly, the user interface 70 may be used to receive an absorption voltage value ($V_{Abs}$), which may be a manufacturer's recommended absorption voltage, for example, and store the absorption voltage value ($V_{Abs}$) in a corresponding memory 102. In many cases, the bulk period exit voltage $V_{BulkExit}$ will be equal to the absorption voltage value $V_{Abs}$. However, for added flexibility, these values are separately configurable in the illustrated embodiment. Similarly, the user interface may be used to receive user input representing a float voltage ($V_{Float}$), an absorption exit current ($I_{AbsExit}$), an absorption voltage timeout value ($T_{AbsTimeout}$), and an amp-hour rating (AH Rating) representing a capacity rating of the battery 18 shown in FIG. 1. The AH Rating may be received because in some embodiments, the absorption exit current value $I_{AbsExit}$ may be configured to be a proportion, such as a proportion between 1% and 5%, of the AH Rating of the battery (18). However, also for added flexibility, the absorption exit current value $I_{AbsExit}$ and the amp-hour rating (AH Rating) are separately configurable in the illustrated embodiment. The user interface 70 may also be used to receive a maximum charge controller current value ($I_{Max}$) representing a maximum of the current that the charge controller 14 can supply without overloading the charge controller 14, the inverter 16, the battery 18, or the bus 20, shown in FIG. 1. These values are stored in respective corresponding locations $V_{Float}$ 104, $I_{AbsExit}$ 106, $T_{AbsTimeout}$ 108, AH Rating 110, and $I_{Max}$ 162.

Figure 5:
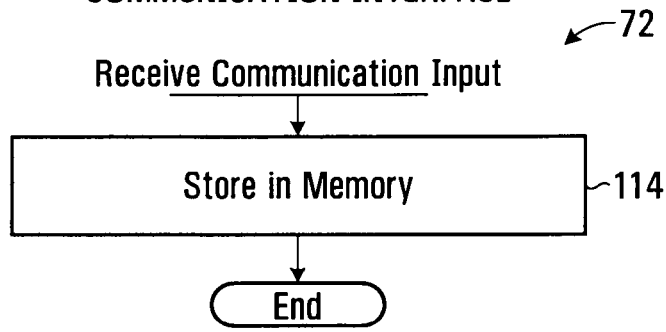
FIG. 5 is a flow chart of a communication interface executed by the charge controller shown in FIG. 3.

Referring to FIGS. 3 and 5, the communication interface 72 is shown in greater detail, and controls the bidirectional input/output 68 to permit the charge controller processor circuit 30 shown to communicate with the inverter 16 shown in FIG. 1. Essentially, the communication interface 72 is adapted to receive a communication from the inverter (16) and extract from that communication an inverter current value $I_I$ representing current measured by the second current measuring device 24 shown in FIG. 1. On extraction of this inverter current value, such value is stored in a corresponding $I_i$ memory 112 in the variable memory 38 under the direction of block 114 in FIG. 5. Of course, other communications functions may also be provided, but for the purposes and context of the present invention, the storage of the inverter current value $I_I$ is of most interest. In some embodiments, such as the system 280 illustrated in FIG. 14 for example, the $I_I$ memory 112 in the variable memory 38 may store a plurality of inverter current $I_I$ values for respective inverters, and therefore the $I_I$ memory 112 is illustrated in FIG. 3 as plurality of stores in dotted lines, to emphasize that a single store in the $I_I$ memory 112 is sufficient in many embodiments, but that a plurality of such stores are preferable in an alternative embodiment described below.

Figure 6:
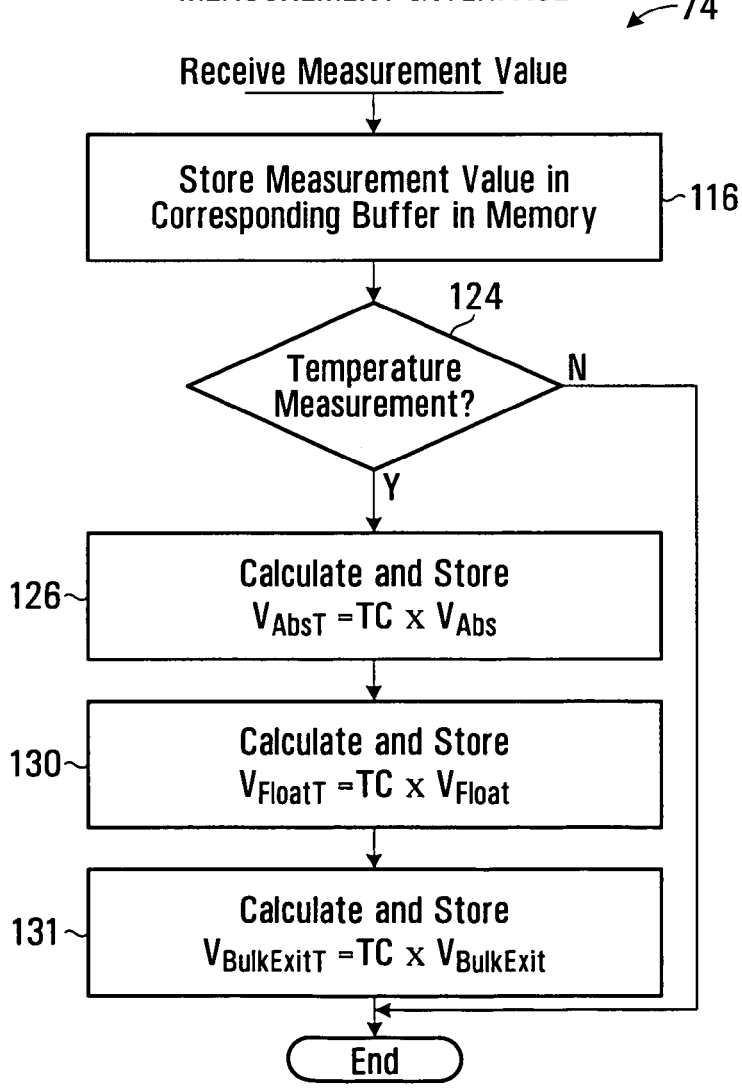
FIG. 6 is a flow chart of a measurement interface executed by the controller shown in FIG. 3.

Referring to FIGS. 3 and 6, the measurement interface 74 is shown in greater detail, and is actuated upon receipt of an interrupt from the I/O device 34 produced whenever a battery voltage value $V_B$, charger current value $I_C$, or battery temperature value $T_B$ is received at one of the inputs 60, 62, or 66. Alternatively, the measurement interface 74 may be adapted to perform a polling function to sample signals at the inputs 60, 62, and 66 to receive the battery voltage value $V_B$, charger current value $I_C$, and battery temperature value $T_B$. In any event, whenever a battery voltage value $V_B$, charger current value $I_C$, or battery temperature value $T_B$ is received, block 116 of the measurement interface 74 directs the processor 32 to store the received value in a corresponding buffer in the variable memory 38. In this regard, referring to FIG. 3, the variable memory has a battery voltage value $V_B$ memory 118 for storing a battery voltage value $V_B$ received at the input 60, a charger current value $I_C$ memory 120 for receiving a charger current value $I_C$ received at the input 62, and a battery temperature memory 122 for receiving and storing a battery temperature value received at the input 66. Again, the $I_C$ memory 120 is illustrated in FIG. 3 as plurality of stores in dotted lines, to emphasize that a single store in the $I_C$ memory 120 is sufficient in many embodiments, but that in some embodiments, such as the system 280 illustrated in FIG. 14 for example, the $I_C$ memory 120 may store a plurality of current values $I_C$ for respective charge controllers.

Still referring to FIGS. 3 and 6, block 124 directs the processor 32 to determine whether or not the received measurement value is a temperature measurement, and this can be determined by observing that the received measurement value $T_B$ is received at the input 66, for example. When a temperature measurement value $T_B$ is received, block 126 directs the processor 32 to calculate and store a temperature compensated absorption voltage value $V_{AbsT}$ and store it in a corresponding $V_{AbsT}$ memory 128 in the variable memory 38. The temperature compensated absorption voltage value $V_{AbsT}$ is produced by deriving a temperature compensation (TC) factor from the current battery temperature value $T_B$ stored in the battery temperature $T_B$ memory 122, and multiplying TC by the contents of the absorption voltage $V_{Abs}$ as indicated by the contents of the absorption voltage $V_{Abs}$ memory 102. For example, the program memory 36 may be preconfigured with a table (not shown) associating various TC factors with respective battery temperature values so that a TC factor can be derived from the battery temperature value $T_B$ stored in the battery temperature $T_B$ memory 122. Alternatively, the program memory 36 may be programmed with a table (not shown) representing temperature compensated absorption voltage values for various battery temperatures, such that knowing only the battery temperature, a corresponding temperature compensated absorption voltage value $V_{AbsT}$ can be obtained and stored in the temperature compensated absorption voltage value $V_{AbsT}$ memory 128.

Similarly, still referring to FIGS. 3 and 6, block 130 directs the processor 32 to calculate and store a temperature compensated float voltage value $V_{FloatT}$, and to store this value in a $V_{FloatT}$ memory 132. The $V_{FloatT}$ value is calculated in a manner similar to that described above in connection with block 126, wherein the $V_{Float}$ value stored in memory 104 is multiplied by the TC factor derived from the contents of the battery temperature $T_B$ memory 122, to produce the $V_{FloatT}$ value. Again alternatively, the program memory 36 may be pre-configured with a table (not shown) that associates battery temperatures with corresponding $V_{FloatT}$ values.

Likewise, block 131 directs the processor 32 to calculate and store a temperature compensated bulk period exit voltage $V_{BulkExitT}$. The temperature compensated bulk period exit voltage $V_{BulkExitT}$ is calculated by multiplying the bulk period exit voltage value from the $V_{BulkExit}$ memory 100 with the temperature compensation factor (TC) derived from the contents of the battery temperature $T_B$ memory 122. Again alternatively, the program memory 36 may be pre-configured with a table (not shown) that associates battery temperatures with corresponding $V_{BulkExitT}$ values. The temperature compensated bulk period exit voltage $V_{BulkExitT}$ is then stored in a temperature compensated bulk period exit voltage $V_{BulkExitT}$ memory 101. Thus, in effect, every time a battery temperature measurement $T_B$ is taken or received, a new temperature compensated $V_{AbsT}$ voltage is stored in the $V_{AbsT}$ memory 128, a new temperature compensated float voltage $V_{FloatT}$ is stored in the $V_{FloatT}$ memory 132, and a new temperature compensated bulk period exit voltage $V_{BulkExitT}$ is stored in the $V_{BulkExitT}$ memory 101. As indicated above, the bulk period exit voltage $V_{BulkExit}$ will, in many cases, be equal to the absorption voltage value $V_{Abs}$, and thus the temperature compensated voltages $V_{BulkExitT}$ and $V_{AbsT}$ would also be equal in those cases, although in the illustrated embodiment, these voltages may differ.

Referring back to FIG. 6, at block 124 if the received measurement value is not a temperature measurement, blocks 126 and 130 are omitted (i.e., the temperature compensated absorption voltage and temperature compensated float voltage values are not updated) and the measurement interface process 74 is ended.

Figure 7:
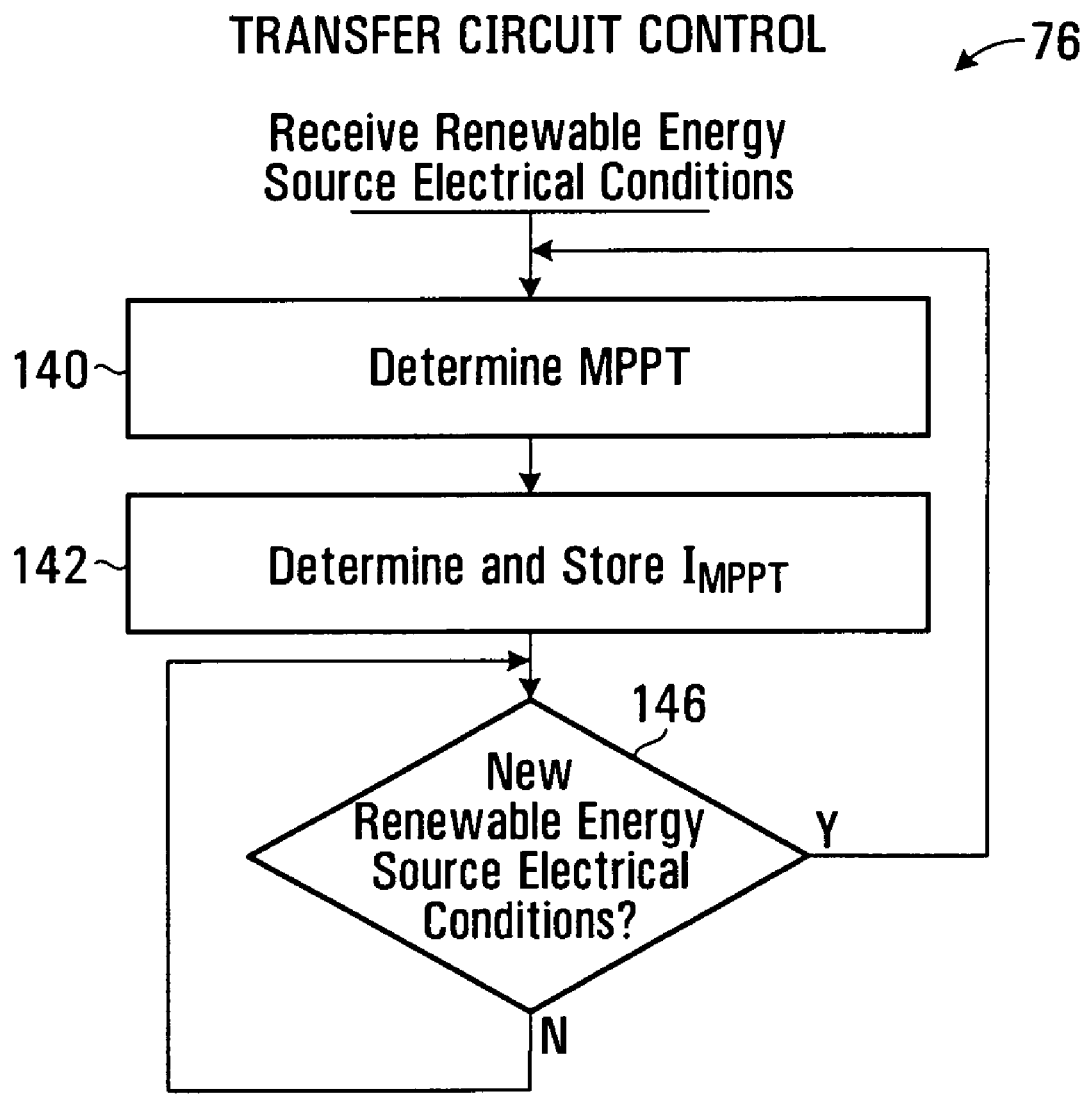
FIG. 7 is a flow chart of a transfer circuit control process executed by the charge controller shown in FIG. 3.

Referring to FIGS. 3 and 7, the transfer circuit control process is shown at 76, and is engaged by causing the processor 32 to cause the I/O device 34 to poll the transfer circuit 40 or to receive an interrupt from the transfer circuit 40 to indicate that new renewable energy source electrical conditions are known. The renewable energy source electrical conditions include a present voltage and present current measured at the input 50 to the transfer circuit, representing a current voltage and current of the renewable energy source (12). In the case of a PV array as shown in FIG. 1, the transfer circuit control process 76 includes a first block 140 that directs the processor 32 to determine a maximum power point (MPPT) of the renewable energy source (12), in accordance with known methods. By determining the maximum power point, the processor 32 determines voltage and current values that should be maintained at the input 50 to the transfer circuit 40 in order to draw the maximum available power from the renewable energy source (12). Thus, the transfer circuit 40 puts sufficient load on the renewable energy source (12) to move the voltage from that source to an optimum level, while drawing a maximum current from the renewable energy source (12). It will be appreciated that in the case of a PV array, the maximum current that can be drawn will depend on atmospheric conditions such as cloud cover, for example, and thus the maximum power point can vary considerably throughout the day. Thus, the maximum current that should be drawn from the renewable energy source (12) varies throughout the day. Consequently, block 142 directs the processor 32 to determine the maximum current $I_{MPPT}$ that should be drawn from the renewable energy source (12) to maintain the maximum power point. Once this value $I_{MPPT}$ is determined, it is stored in a corresponding $I_{MPPT}$ memory 144 of the variable memory 38.

Block 146 then directs the processor 32 to determine whether any new renewable energy source electrical conditions are available and if not, to wait until they are available. When a new renewable energy source electrical condition is available, the processor 32 is directed back to block 140 to determine a new maximum power transfer point and then to determine and store a new maximum power point current $I_{MPPT}$. Thus, the contents of the maximum charger current $I_{MPPT}$ memory 144 are constantly being updated with the maximum charger current value for current weather conditions.

Figure 8:
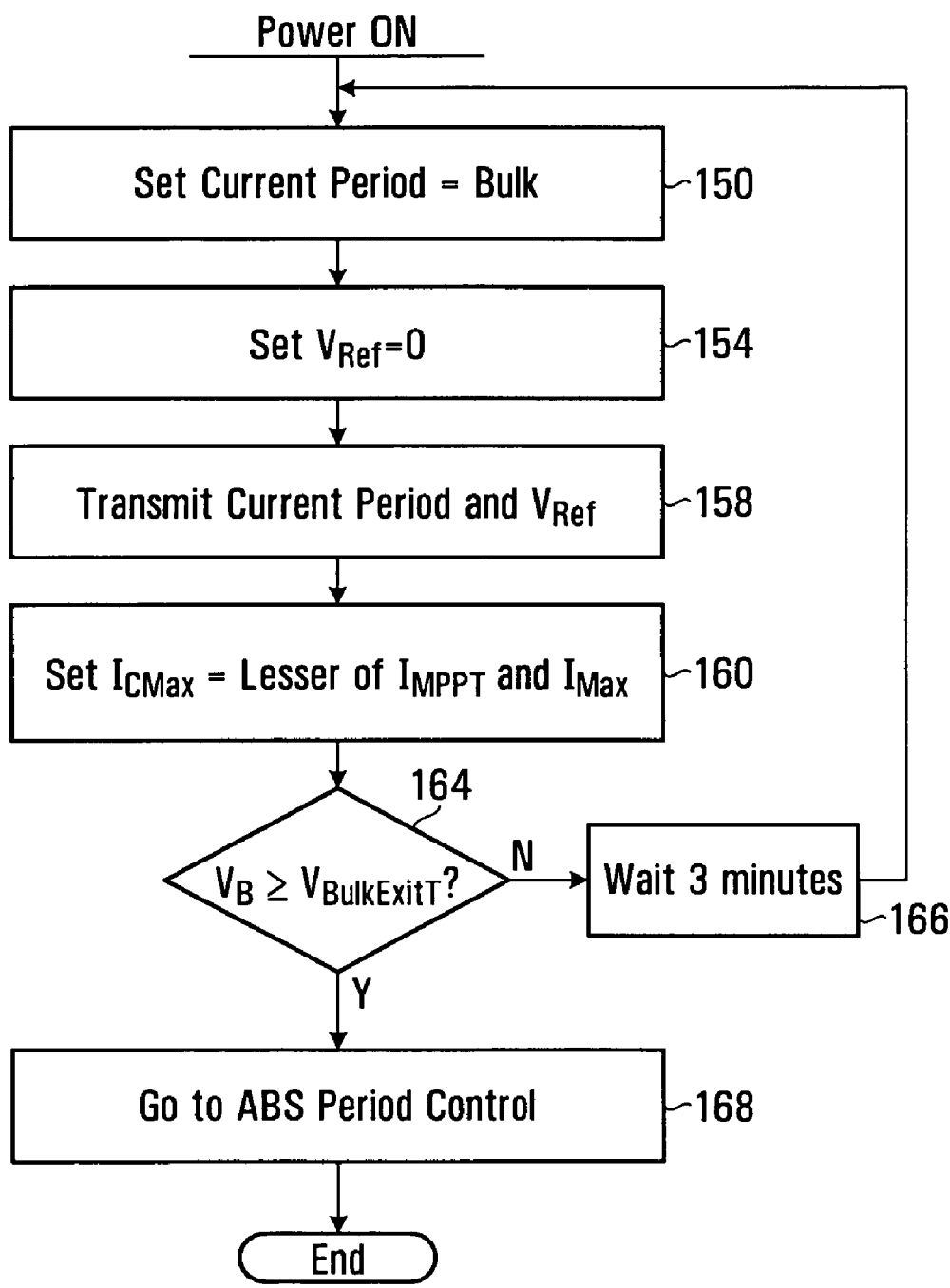
FIG. 8 is a flow chart of a bulk period control process executed by the charge controller shown in FIG. 3.

Referring to FIGS. 3 and 8, the bulk period control process is shown generally at 78. The bulk period control process 78 is entered immediately upon power powering on the charge controller (14), and this may occur at the beginning of the day for example, when the voltage and current available from the renewable energy source (12) meet certain minimum criteria. Thus, referring to FIGS. 3 and 8, as soon as the charge controller (14) is powered on, block 150 directs the processor 32 to store in a current period memory 152 of the variable memory 38, a code representing that the current period of the charge cycle is the bulk charging period. Again, the current period memory 152 is illustrated in FIG. 3 as plurality of stores in dotted lines, to emphasize that a single store in the current period memory 152 is sufficient in many embodiments, but that in some embodiments, such as the system 280 illustrated in FIG. 14 for example, the current period memory 152 may store a plurality of current period codes for respective charge controllers.

Block 154 then directs the processor 32 to set the contents of a reference voltage value $V_{Ref}$ memory 156 to 0. Block 158 then directs the processor 32 to transmit the contents of the current period memory 152 and the reference voltage value $V_{Ref}$ memory 156 to the inverter (16, shown in FIG. 1) through the bidirectional input/output 68. Block 160 then directs the processor 32 to calculate and store in a memory $I_{CMax}$ 163, the value representing the lesser of the contents of the maximum power transfer point current value as represented by the contents of the $I_{MPPT}$ memory 144 and the maximum charge controller current value as represented by the contents of the $I_{Max}$ memory 162 in the variable memory 38. The processor 32 issues commands to the transfer circuit 40 as required to cause the switching transistors (not shown) of the transfer circuit to receive at the input 50, and transfer to the output 52, no more current than the current represented by the contents of the $I_{CMax}$ memory 163.

Block 164 then directs the processor 32 to determine whether or not the contents of the battery voltage $V_B$ memory 118 are greater than or equal to the contents of the temperature compensated bulk period exit voltage $V_{BulkExitT}$ 101. If not, block 166 directs the processor 32 to wait a certain time period, in this embodiment 3 minutes, and then to return to execute the process 78 again beginning at block 150. The waiting time used at block 166 may depend on the responsiveness of the battery, for example, but 3 minutes has been found to be suitable period to wait.

Figure 9:
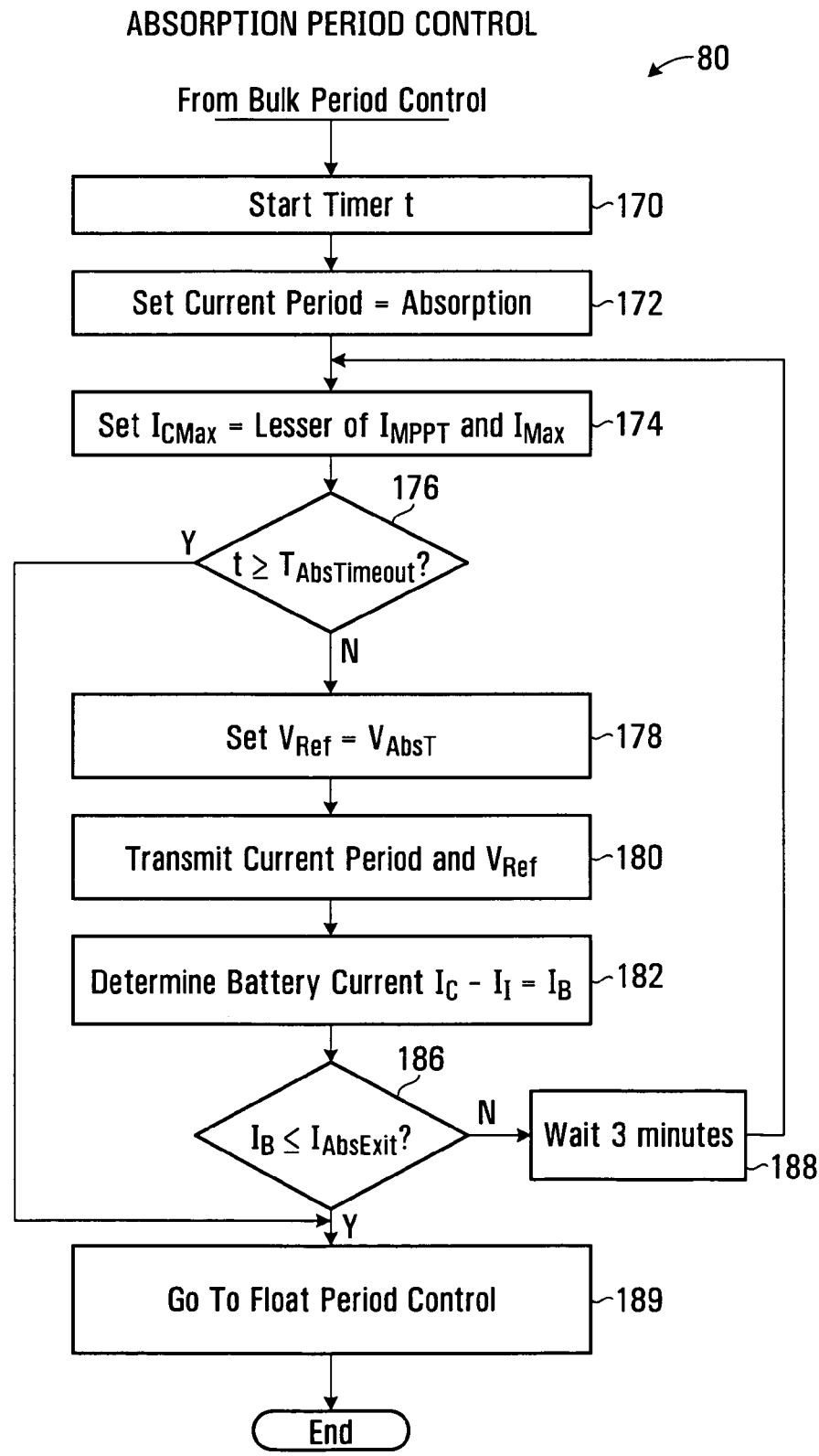
FIG. 9 is a flow chart of an absorption period control process executed by the charge controller shown in FIG. 3.

Block 168 is executed if the battery voltage $V_B$ is greater than or equal to the temperature compensated bulk period exit voltage $V_{BulkExitT}$, and block 168 directs the processor 32 to start executing the absorption period control process shown at 80 in FIG. 9.

Referring to FIGS. 3 and 9, the absorption period control process 80 is entered when the measured battery voltage value in the battery voltage $V_B$ memory 118 is greater than or equal to the temperature compensated bulk period exit voltage value $V_{BulkExitT}$ stored in memory 101. The absorption period control process 80 begins with a first block 170 that directs the processor 32 to start a timer to monitor the time (t) during which the absorption period is in effect. Block 172 then directs the processor 32 to set the contents of the current period memory 152 to include a code representing that the current period in effect is the absorption period. Block 174 then directs the processor 32 to set the contents of the $I_{CMax}$ memory 163 equal to the lesser of the contents of the maximum power point current $I_{MPPT}$ memory 144 and the maximum charge controller current $I_{Max}$ memory 162.

Block 176 then directs the processor 32 to determine whether or not the current time (t) represented by the timer that was started at block 170 is greater than or equal to the absorption period timeout value stored in the absorption period timeout $T_{AbsTimeout}$ memory 108. If not, then block 178 directs the processor 32 to set the contents of the reference voltage value $V_{Ref}$ memory 156 equal to the contents of the temperature compensated absorption voltage $V_{AbsT}$ memory 128, and block 180 directs the processor to transmit to the inverter (16) through the bidirectional input/output 68, the contents of the current period memory 152 and the contents of the reference voltage value $V_{Ref}$ memory 156. Block 182 then directs the processor 32 to determine a battery charge current value $I_B$ by subtracting the inverter current value stored in the inverter current value $I_I$ memory 112 from the charger current value stored in the charger current value $I_C$ memory 120, and to store the result in a battery current $I_B$ memory 184. Block 186 then directs the processor 32 to determine whether or not the contents of the battery current $I_B$ memory 184 are less than or equal to the contents of the absorption period exit current $I_{AbsExit}$ memory 106. If not, then block 188 directs the processor to wait 3 minutes, for example, and then return to execute the absorption period control process again beginning with block 174.

Figure 10:
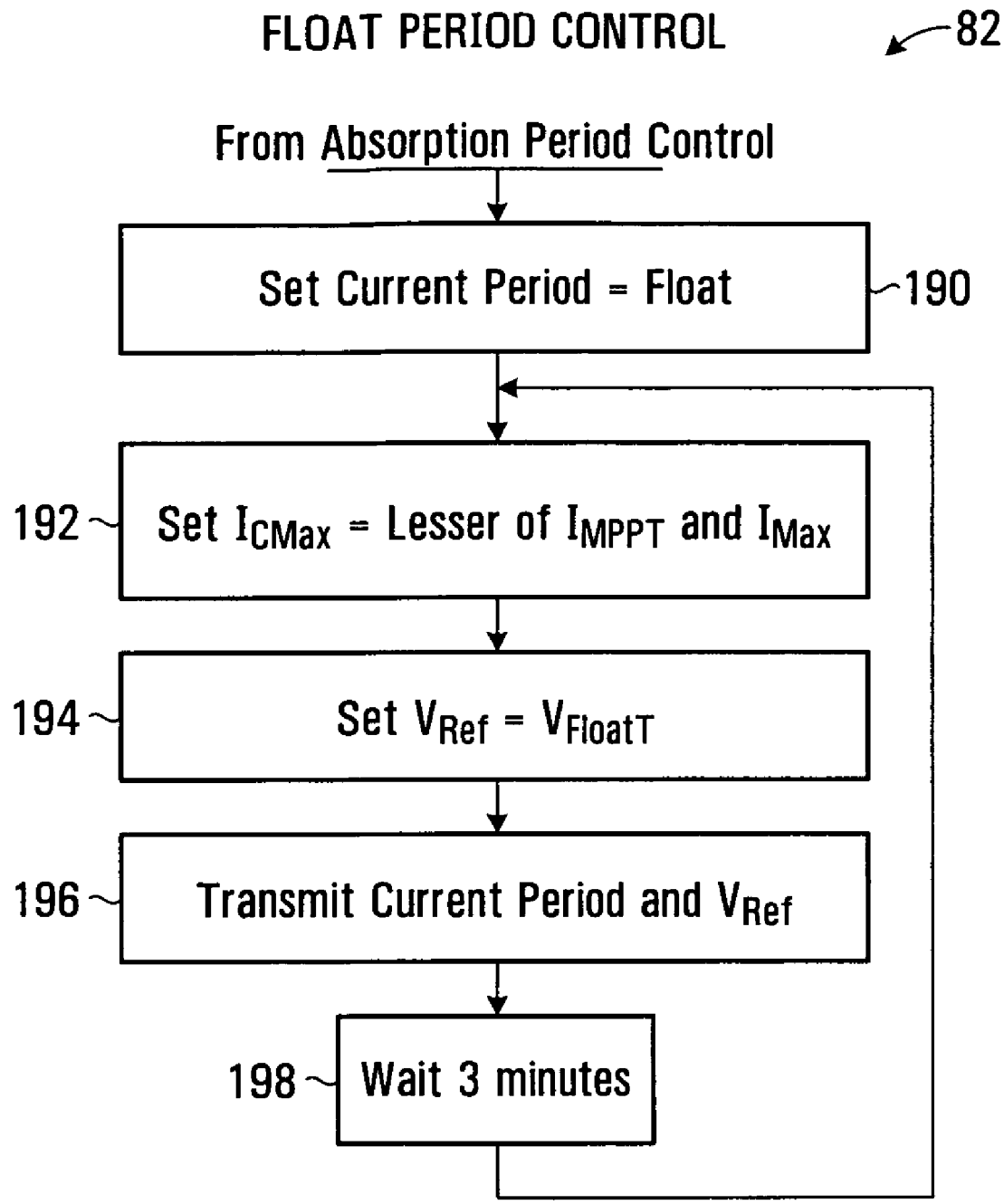
FIG. 10 is a flow chart of a float period control process executed by the charge controller shown in FIG. 3.

If at block 176 the current time (t) represented by the timer is greater than or equal to the absorption period timeout value stored in the $T_{AbsTimeout}$ memory 108, or if at block 186 the battery current $I_B$ in the $I_B$ memory 184 is less than or equal to the absorption period exit current in the $I_{AbsExit}$ memory 106, the processor 32 is directed at block 189 to execute the float period control process shown at 82 in FIG. 10.

The float period control process is shown generally at 82 in FIG. 10. The float period control process 82 is entered from block 189 of the absorption period control process 80. Thus, when the current supplied $I_B$ to the battery (18) is less than the absorption current exit value in the $I_{AbsExit}$ memory 106, the float period control process 82 is initiated. Referring to FIGS. 3 and 10, the float period control process 82 begins with a first block 190 that directs the charge controller processor 32 to replace the contents of the current period memory 152 with a code representing that the current period is the float period.

Block 192 then directs the processor 32 to set the contents of the $I_{CMax}$ memory 163 to the lesser of the contents of the MPPT current $I_{MPPT}$ memory 144 and the maximum charge controller current $I_{Max}$ memory 162. Block 194 then directs the processor to set the contents of the reference voltage $V_{Ref}$ memory 156 with the contents of the $V_{FloatT}$ memory 132. Block 196 then directs the processor 32 to transmit the contents of the current period memory 152 and the reference voltage $V_{Ref}$ memory 156 to the inverter (16) through the bidirectional input/output 68. Block 198 then directs the processor to wait for 3 minutes, for example, and then to return to block 192 to continue the float period control process 82 from there.

In effect therefore, referring to FIGS. 1 and 3, it can be seen that the charge controller 14 is operably configured to transmit an indication of the current period of the charging sequence and a reference voltage value associated with the current period of the charging sequence to the inverter 16. The charge controller 14 sets the indication of the current period of the charging sequence to indicate that the current period is the absorption period, and to set the reference voltage to correspond to an absorption voltage of the battery 18, when the measured battery voltage meets a bulk charge exit criterion. In this embodiment, the bulk charge exit criterion is that the contents of the battery voltage $V_B$ memory 118 are greater than or equal to the contents of the temperature compensated bulk period exit voltage $V_{BulkExitT}$ memory 101. In addition, the charge controller 14 sets the indication of the current period of the charging sequence to indicate that the current period is the float period, and sets the reference voltage to correspond to a float voltage of the battery 18 that is less than the absorption voltage of the battery, when the charger current value $I_C$ and inverter current value $I_I$ meet absorption period exit criteria, the absorption period exit criteria in this embodiment being that the difference between the charger current $I_C$ and the inverter current $I_I$ (i.e., the current $I_B$ applied to the battery 18 shown in FIG. 1) is less than or equal to an absorption exit current stored in the absorption exit current $I_{AbsExit}$ memory 106. Thus, in this embodiment, the absorption period exit criteria in this embodiment are satisfied when the current $I_B$ applied to the battery (18) is less than or equal to the absorption exit current stored in the absorption exit current $I_{AbsExit}$ memory 106, or when the total time (t) in the absorption period is greater than or equal to the absorption period timeout value stored in the $T_{AbsTimeout}$ memory 108.

Figure 11:
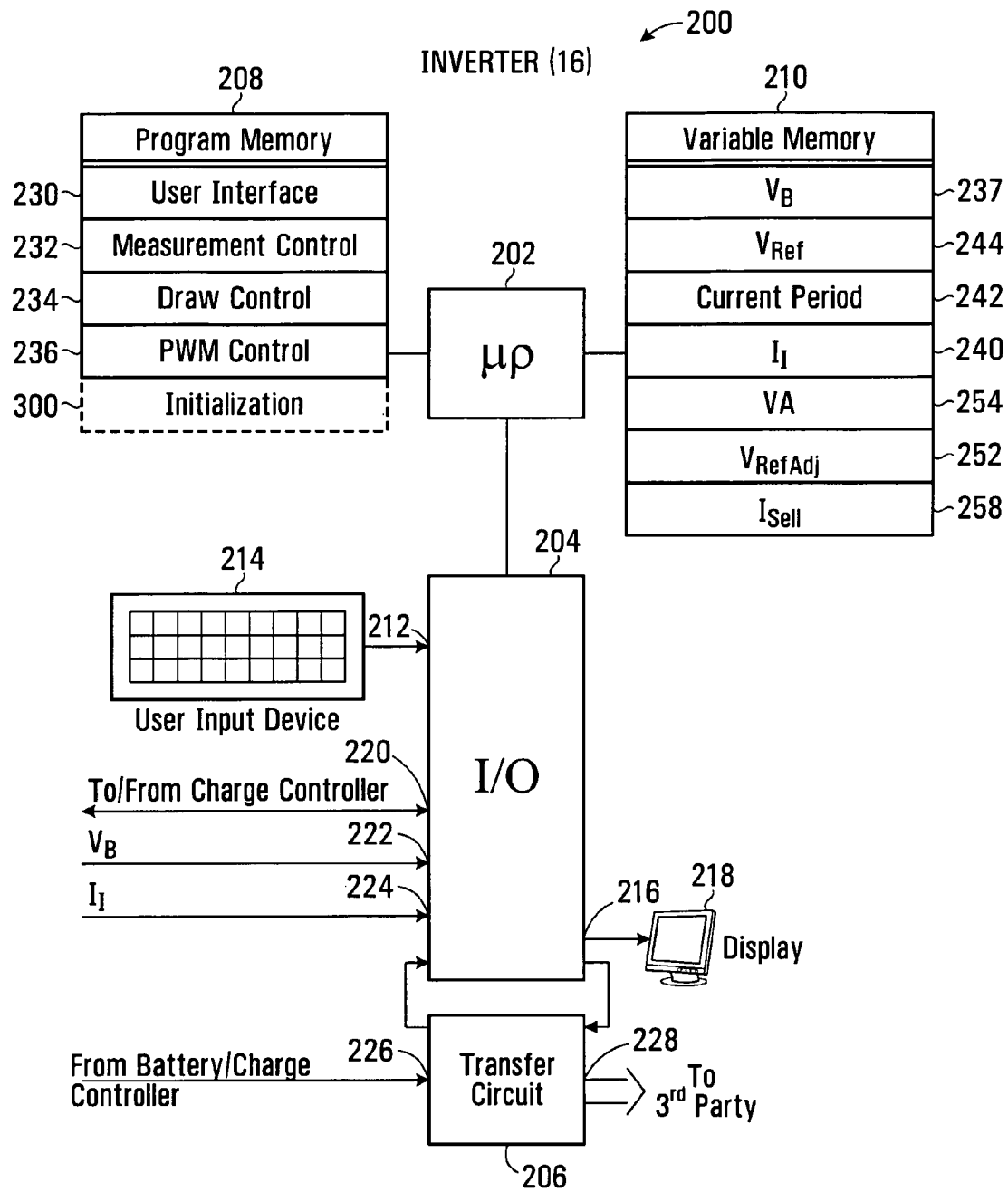
FIG. 11 is a block diagram of an inverter shown in FIG. 1.

Referring to FIG. 11, a processor circuit of the inverter (16) shown in FIG. 1 is shown generally at 200. The inverter (16) includes a processor 202, an input/output (I/O) device 204, a transfer circuit 206, program memory 208, and variable memory 210. The I/O device 204 has an input 212 for receiving signals from a user input device 214, such as a keyboard for example. The I/O device 204 also has an output 216 operable to be connected to a display 218 for displaying status information and user input. The I/O device 204 further has a bidirectional input/output 220 for communicating with the charge controller (14). The I/O device 204 also has a battery voltage input 222 and an inverter current input 224 for receiving, respectively, a battery voltage signal $V_B$ from the battery voltage measuring device 25 shown in FIG. 1 and an inverter current value $I_I$ from the second current measuring device 24 shown in FIG. 1. It will be appreciated that the inverter (16) may alternatively include its own battery measurement device (not shown) for measuring battery voltage $V_B$ and its own internal inverter current measurement device, such as a shunt for example, for measuring current $I_I$ received at the inverter.

The transfer circuit 206 has an input 226 and an output 228. The input 226 is connected to the bus 20 (shown in FIG. 1) to receive current from the bus, and more particularly current from the charge controller 14 and/or the battery 18 (shown in FIG. 1). The inverter current value $I_I$ received at the input 224 is a measure of the current received at the input 226 to the transfer circuit 206. The output 228 of the transfer circuit 206 is connected to a third party system, such as a power grid for example, and preferably provides output electrical energy in either an AC or DC format for use by the third party. The transfer circuit 206 preferably includes a switched bridge of transistors (not shown) controlled by commands issued by the processor 202 through the I/O device 204 for providing pulses in a pulse width modulation (PWM) format for controlling the switching bridge (not shown) to provide either AC or DC to the third party at the output 228 derived from current received at the transfer circuit input 226.

Still referring to FIG. 11, the program memory 208 includes blocks of code for directing the processor 202 to execute various processes including a user interface process 230, a measurement control process 232, a draw control process 234 [*INVENTOR: We have left this process as the "draw control process" because "draw" may be more active than "drain". If you would like us to used "drain", please contact us.], and a pulse width modulation control process 236. The user interface process 230 is essentially the same user interface process 70 as shown in FIG. 4 and may be used to enter and store a voltage adjustment value (VA) in a voltage adjustment memory 254, for example.

Figure 12:
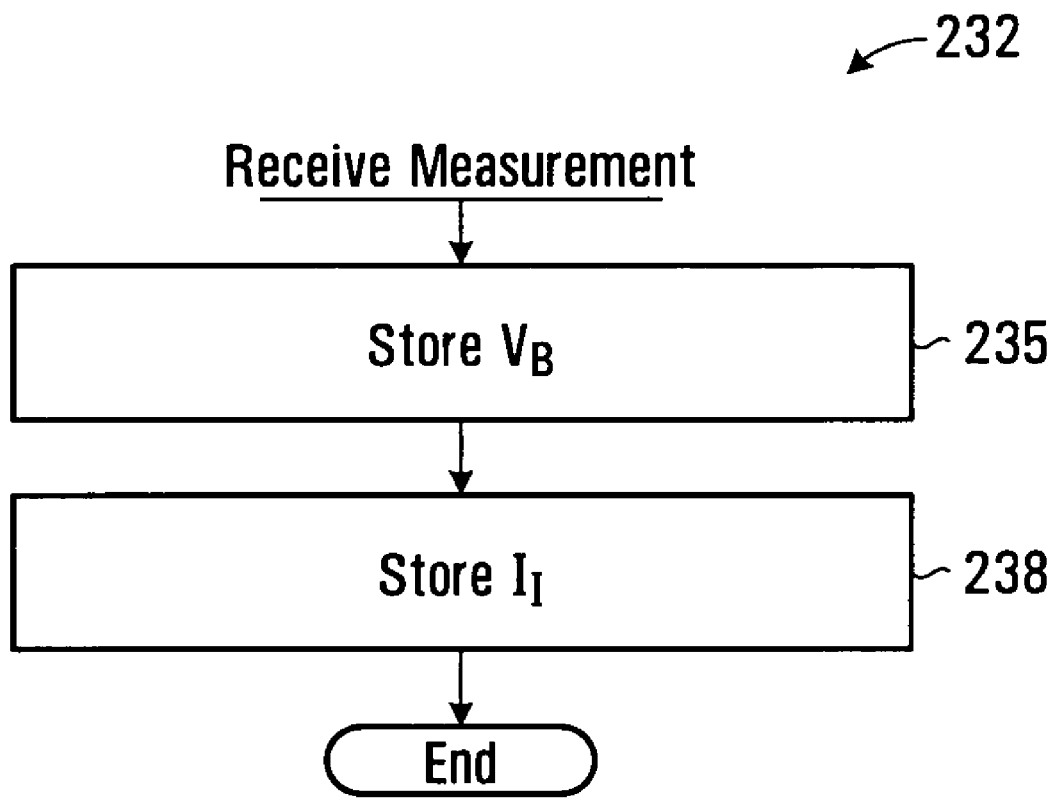
FIG. 12 is a flow chart of measurement control process executed by the inverter shown in FIG. 11.

Referring to FIGS. 11 and 12, the measurement control process 232 is invoked upon receipt of a measurement, which may be either the value representing the battery voltage $V_B$ received at the input 222 of the I/O device 204, or an inverter current value $I_I$ received at the input 224 of the I/O device 204. Upon receipt of these values at either of these inputs, block 235 directs the processor 202 to store the battery voltage value $V_B$ received at the input 222 in a battery voltage value $V_B$ memory 237 of the variable memory 210, and block 238 directs the processor 202 to store the inverter current value $I_I$ received at the input 224 of the I/O device 204 in an inverter current $I_I$ memory 240 in the variable memory 210. The measurement process 232 is then ended until the next measurements are received.

Figure 13:
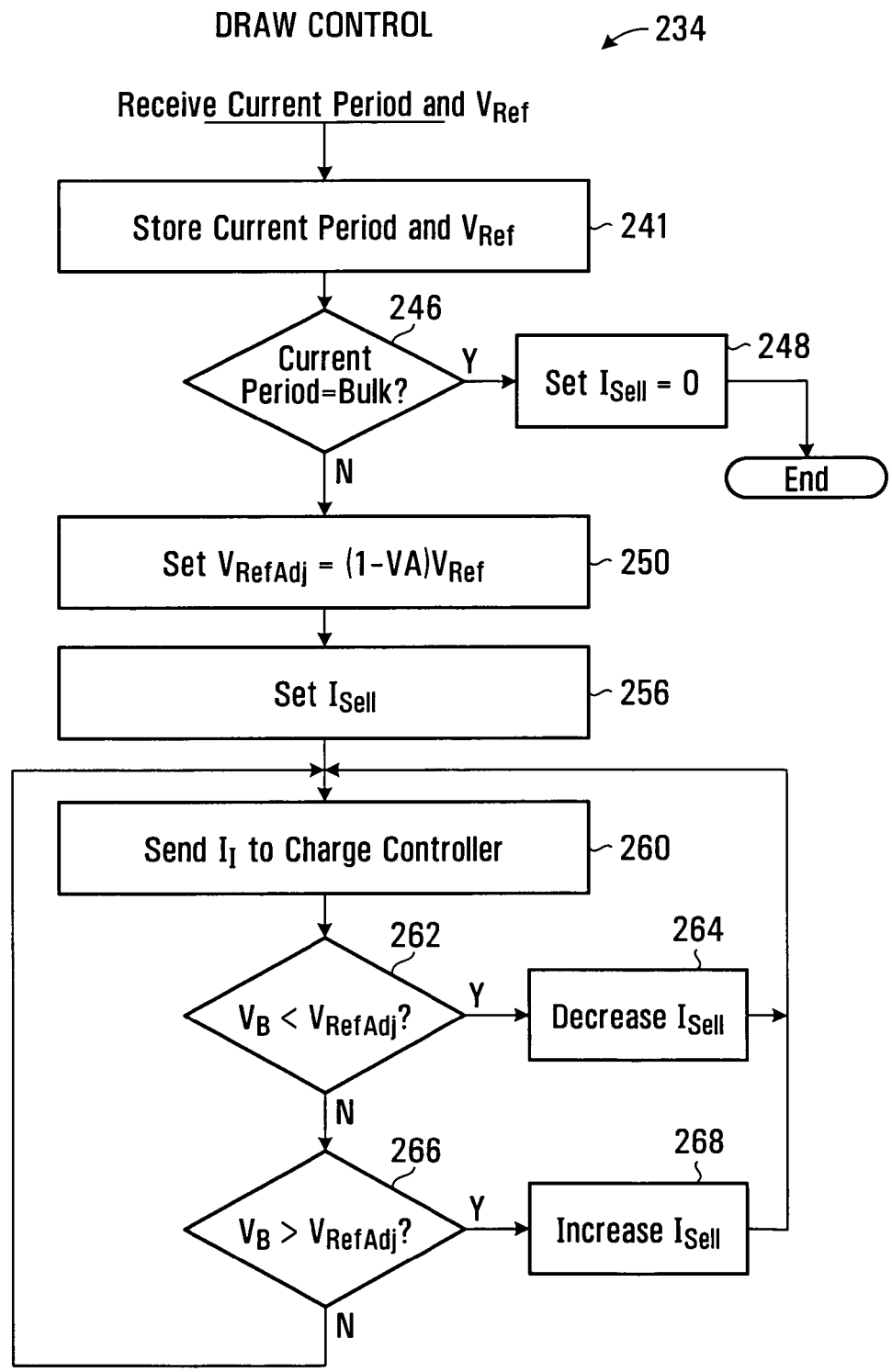
FIG. 13 is a flow chart of a draw control process executed by the inverter shown in FIG. 11.

Referring to FIGS. 11 and 13, the draw control process 234 is shown in greater detail. The draw control process 234 is initiated upon receipt of the current period code and the reference voltage value $V_{Ref}$ at the bidirectional input/output 220, in response to a transmission from the charge controller (14) including these values. The current period code is stored in a memory 242 and the reference voltage is stored in a reference voltage $V_{Ref}$ memory 244. This is indicated at block 241 in FIG. 13. Block 246 then directs the processor 202 to determine whether or not the contents of the current period memory 242 hold a code representing that the current period is the bulk period. If so, then block 248 directs the processor 202 to set the contents of an $I_{Sell}$ memory 258 in the variable memory 210 to zero [*INVENTOR: Should $V_{Ref}$ or $V_{RefAdj}$ also be modified?] and then to end the draw control process 234. The draw control process will of course be initiated again, upon receipt of the next transmission from the charge controller (14) that includes a current period code and/or a reference voltage $V_{Ref}$ value.

If at block 246 the contents of the current period memory 242 do not hold the bulk period code but rather hold either a code representing the absorption period or the float period, then block 250 directs the processor 202 to set the contents of an adjusted reference voltage $V_{RefAdj}$ memory 252 to a number that is a fraction of the contents of the reference voltage $V_{Ref}$ memory 244. This fraction may be provided by the voltage adjustment value (VA) stored in the voltage adjustment value VA memory 254. The voltage adjustment VA value may be received through user input received at the input 212 of the I/O device 204, for example. In the embodiment shown, the voltage adjustment value is 2%, which means that the contents of the reference voltage $V_{Ref}$ memory 244 are adjusted downward by 2%. In other words, in this embodiment, a multiplication factor of (1−0.02) or 0.98 is applied to the contents of the reference voltage $V_{Ref}$ memory 244 to produce the adjusted reference voltage value $V_{RefAdj}$, and that value is stored in the adjusted reference voltage $V_{RefAdj}$ memory 252.

Block 256 then directs the processor to set a nominal sell current $I_{Sell}$ value, which may be, for example, the last known sell current value $I_{Sell}$ used by the inverter (16), and to store this value in the $I_{Sell}$ memory 258. Block 260 then directs the processor 202 to send the inverter current value stored in the inverter current $I_I$ memory 240 to the charge controller (14) through the bi-directional input/output 220. Block 262 then directs the processor 202 to determine whether or not the current contents of the battery voltage $V_B$ memory 237 are less than the contents of the adjusted reference voltage $V_{RefAdj}$ memory 252. If so, block 264 directs the processor to decrease the contents of the $I_{Sell}$ memory 258 by a fraction, such as 5% for example, and then to go back and re-execute block 260 to send an updated inverter current value from the inverter current $I_I$ memory 240, to the charge controller (14). It will be appreciated that any time during the draw control process 234, a new inverter current measurement value $I_I$ may be received by the measurement control process 232 shown in FIG. 12, which will update the contents of the inverter current $I_I$ memory 240.

In effect, when the battery voltage is less than the adjusted reference voltage in the $V_{RefAdj}$ memory 252, the sell current value $I_{Sell}$ is continually decreased, and new inverter current $I_I$ values are sent to the charge controller (14). Similarly, as represented by blocks 266 and 268, when the battery voltage $V_B$ from the $V_B$ memory 237 is not less than the adjusted reference voltage $V_{RefAdj}$, but rather is greater than the adjusted reference voltage value stored in the $V_{RefAdj}$ memory 252, the sell current value stored in the $I_{Sell}$ memory 258 is increased by a fractional amount such as 5%, for example, and the process 234 is continued at block 260, whereupon again the contents of the inverter current $I_I$ memory 240 are transmitted to the charge controller (14). In effect, blocks 260, 262, 264, 266, and 268 continually monitor the battery voltage $V_B$ and compare it to the adjusted reference voltage value $V_{RefAdj}$. Should the battery voltage $V_B$ drop below the adjusted reference voltage value $V_{RefAdj}$, the sell current $I_{Sell}$ is decreased to reduce the burden on the charge controller (14), and should the battery voltage $V_B$ exceed the adjusted reference voltage $V_{RefAdj}$, the sell current $I_{Sell}$ is increased to increase the burden on the charge controller (14). As the sell current $I_{Sell}$ is increased or decreased, the battery voltage $V_B$ is thus maintained slightly lower than the reference voltage $V_{Ref}$ provided by the charge controller (14), and the adjusted reference voltage $V_{RefAdj}$ may thus be referred to as a target voltage.

Referring back to FIG. 11, the PWM control process 236 effects a conventional PWM control regime, and causes the transfer circuit 206 to provide current, in an amount represented by the contents of the $I_{Sell}$ memory 258, to the third party by drawing current from the bus 20 shown in FIG. 1.

Thus, referring to FIGS. 1 and 11, when the battery voltage $V_B$ is less than the adjusted reference voltage $V_{RefAdj}$, it is presumed that the charge controller 14 is overburdened, and the current drawn from it must be reduced. Therefore, the energy supplied to the third party is reduced by decreasing the $I_{Sell}$ value in the $I_{Sell}$ memory 258, which changes the amount of current drawn by the inverter 16 and received at the input 226 to the transfer circuit 206, and thus block 260 transfers this new inverter current value $I_I$ to the charge controller 14. When the battery voltage $V_B$ is greater than the adjusted reference voltage $V_{RefAdj}$, the charge controller 14 is likely not burdened enough, and therefore more energy is provided to the third party by increasing the contents of the $I_{Sell}$ memory 258, and again the new inverter current value $I_I$ is transmitted to the charge controller 14. In the above manner, the battery voltage $V_B$ is maintained by the charge controller 14 at approximately the adjusted reference voltage $V_{RefAdj}$, which, as can be seen, is slightly lower than the temperature compensated absorption voltage $V_{AbsT}$ or the temperature compensated float voltage $V_{FloatT}$ depending on the current period of the charging sequence. This tends to burden the charge controller 14 such that the charge controller tends to remain in a constant current mode in which all of the current available from the renewable energy source 12 is utilized to charge the battery 18 in accordance with the above mentioned charging sequence while supplying any current above that required by the battery 18 for charging in the current period of the charging sequence, to be made available to the inverter 16 for export to the third party.

Thus, the charge controller 14 causes the battery 18 to be charged according to the above mentioned charging sequence and the inverter 16 is allowed to draw current for use by the third party with the restriction that the battery voltage required for the current period of the charging sequence is maintained, which thereby ensures that the battery is charged according to the indicated charging sequence and any energy not used in charging the battery is exported to the third party.

Figure 14:
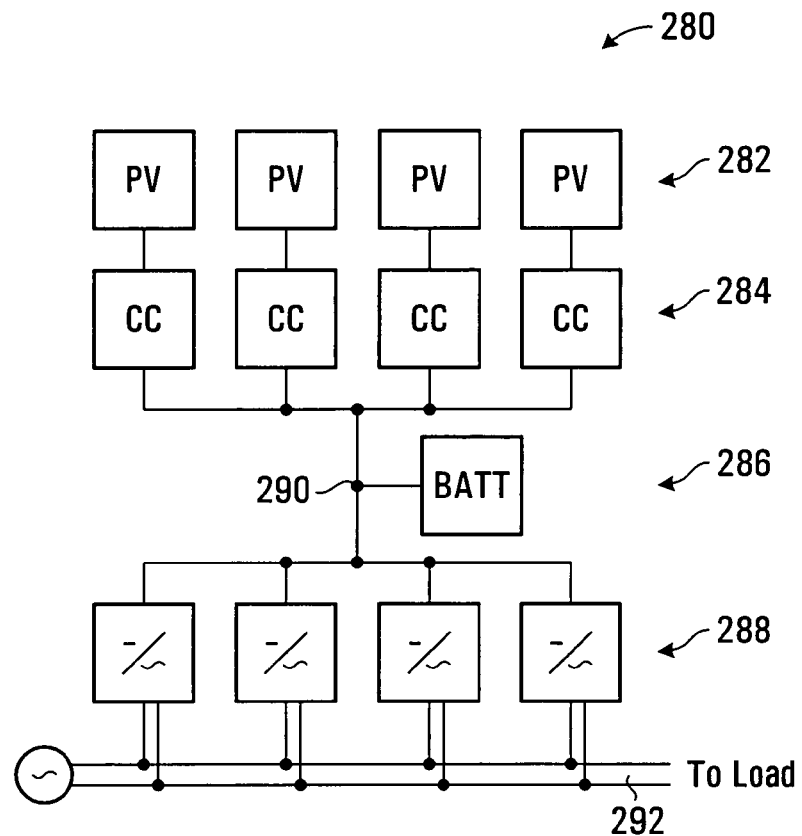
FIG. 14 is a schematic representation of a system according to another embodiment of the invention, for charging a battery from a renewable energy source from a plurality of renewable energy sources wherein the system includes a plurality of charge controllers and inverters.

Referring to FIG. 14, a system according to another embodiment of the invention is shown generally at 280. The system 280 includes a plurality of renewable energy sources illustrated in this embodiment as photovoltaic arrays 282, a plurality of charge controllers 284, a plurality of inverters 288, and at least one battery 286. Each PV array of the plurality of arrays 282 is connected to a respective charge controller of the plurality of charge controllers 284 in the manner shown in FIG. 1. Each charge controller (14) of the plurality of charge controllers 284 is connected to a common bus 290 which is also connected to the at least one battery 286 and to inputs of each inverter in the plurality of inverters 288. In the embodiment shown, each of the inverters (16) is connected to an AC bus 292 to supply power to a common load, although it will be appreciated that each inverter of the plurality of inverters 288 may be connected to respective separate loads, for example.

In a system such as shown in FIG. 14, each charge controller (14) of the plurality of charge controllers 284 and each inverter (16) of the plurality of inverters 288 is generally the same as described in the embodiment above. However, the program memories 36 and 208 of the charge controllers and inverters respectively (illustrated in FIGS. 3 and 11 respectively) are modified to include an initialization process such as shown at 300 in FIG. 15, and the program memory 36 of the charge controllers (illustrated in FIG. 3) is modified to include first and second communication interfaces 310 and 312 shown in FIGS. 16 and 17 respectively. The variable memory 38 of the charge controllers (illustrated in FIG. 3) is also modified as set out below.

Figure 15:
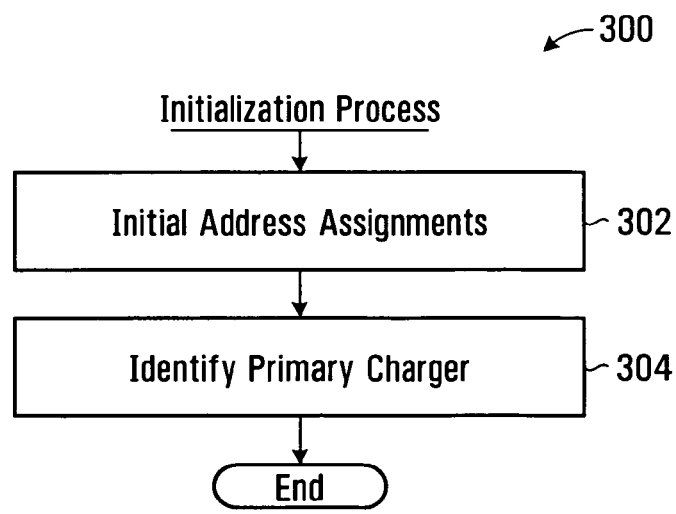
FIG. 15 is a flow chart of an initialization process executed by each of the charge controllers shown in FIG. 14.

Referring to FIG. 15, the initialization process 300 involves two main steps, the first step being the assignment of initial addresses as indicated by block 302, and the second step being the identification of a primary charge controller among the plurality of charge controllers (284 in FIG. 14), as indicated by block 304.

Block 302 may be implemented by a standard dynamic address assignment process for addressing devices on a network. Block 302 may involve, for example, assuming an address from a list of pre-stored addresses, and then broadcasting that address to all other devices on the network. An addressing priority scheme may allow the broadcasted address to be accepted and used by the device that broadcasts it, provided that no other device on the network is already using such an address. The process of assigning initial addresses may also involve sending a message to all other devices on the network to identify the type of device that is attempting to acquire an address. For example, such message may include an indication that a charge controller is attempting to obtain an address or that an inverter is attempting to obtain an address. This may also involve sending in the message or in another message, an identification of the battery bank that the device is associated with. For example, if there are a plurality of battery banks and separate chargers and inverters associated with each different battery bank, this provides a way of identifying the specific battery bank with which specific charge controllers and inverters are associated. The set of charge controllers and inverters, and the battery bank with which the charge controllers and inverters are associated, may collectively be referred to as a "common group". Each device (i.e., charge controller and inverter) may maintain a table (not shown) to keep track of the addresses, types, and associations with respective battery banks (which may be referred to as "DC Associations") of each device on the network to enable specific devices to be selected from which to receive or transmit communications.

Referring to FIGS. 3 and 15, block 304 directs the processor 32 of the charge controller (14) to identify a primary charge controller from among the charge controllers in a common group that are connected to the network. In the above described addressing scheme, it will be appreciated that the addresses may, for example, include hexadecimal values, and the charge controller having the lowest hexadecimal address value may, for example, be designated as a primary charge controller among the plurality of charge controllers in a common group. This may be done, for example, by setting a primary charge controller code in a memory 305 in the variable memory 38 to indicate that the charge controller is a primary charge controller. The status of a charge controller being a primary charge controller may be sent in a message to all of the other devices on the network.

Establishment as a primary charge controller means that that charge controller will be the one in the common group that receives inverter current values from all of the inverters in the common group, and will receive charger current values from all of the other charge controllers in the common group, and will be the only one in the common group that transmits an indication of the current period of the charging sequence and the reference voltage value to the inverters in the common group. Thus, setting the primary charge controller code in the memory 305 to identify a charge controller as a primary charge controller, is intended to automatically invoke these functions.

Figure 18:
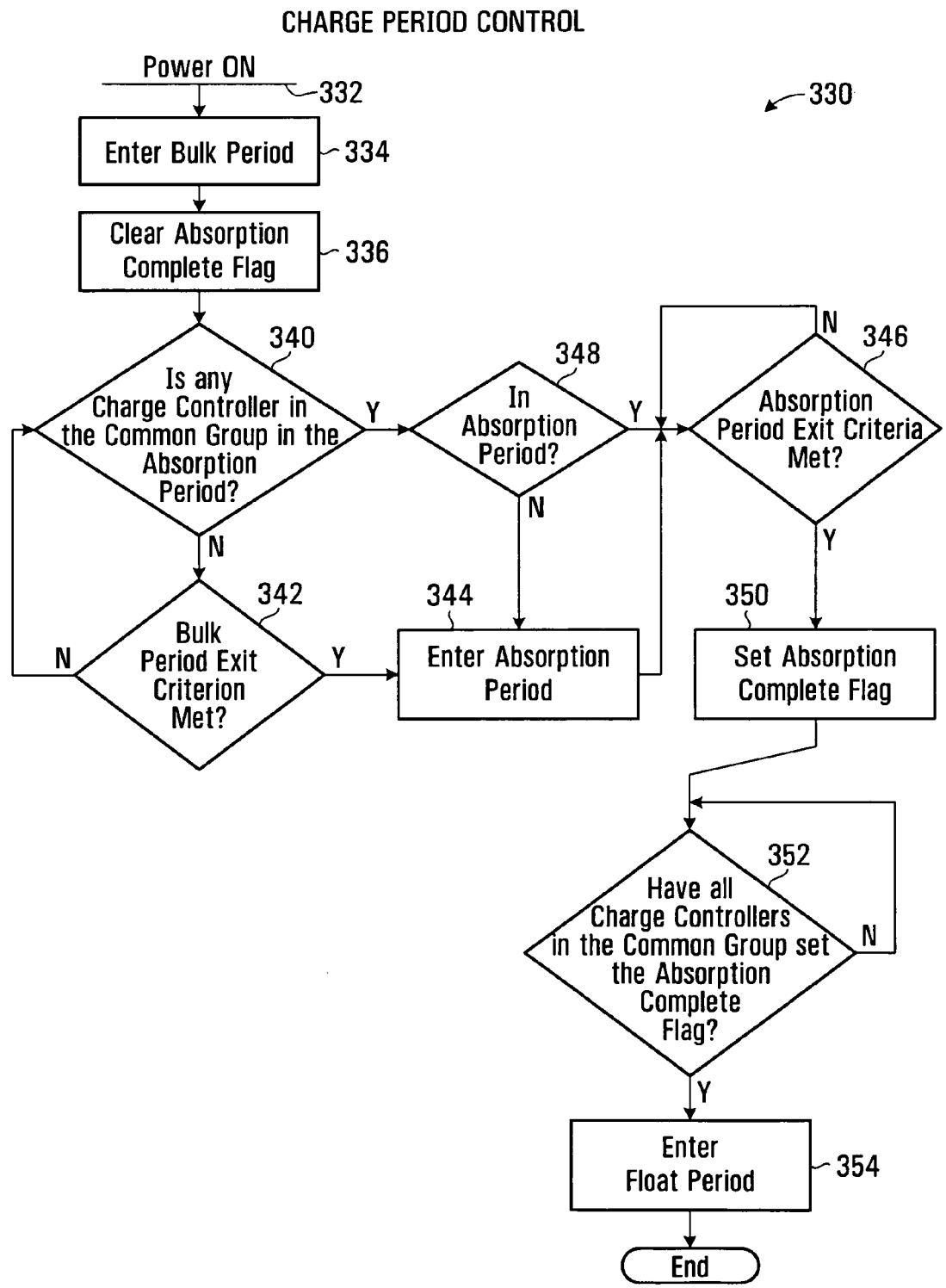
FIG. 18 is a flow chart of a charge period control process executed by each of the charge controllers shown in FIG. 14.

Referring to FIG. 3, as indicated above, the $I_I$ memory 112 in this embodiment may include a plurality of stores for storing a plurality of inverter current $I_I$ values for respective inverters in a common group associated with the charge controller, and the $I_C$ memory 120 and the current period memory 152 may each include a plurality of stores for storing charger current values and current period codes for respective charge controllers in the common group. Furthermore, in this embodiment, the variable memory 38 includes an absorption complete memory 338, and the absorption complete memory 338 includes a plurality of stores for storing absorption complete flag values for respective charge controllers in the common group. The absorption complete flag for a charge controller may be set or cleared as illustrated in FIG. 18 below.

Figure 16:
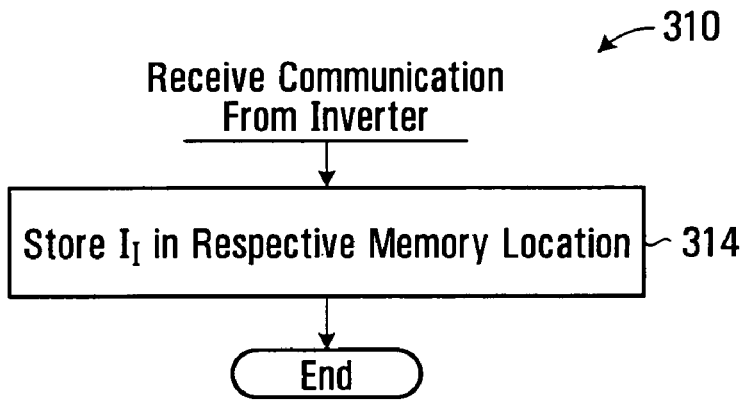
FIG. 16 is a flow chart of a communication interface for receiving a communication from an inverter, executed by each of the charge controllers shown in FIG. 14.
Figure 17:
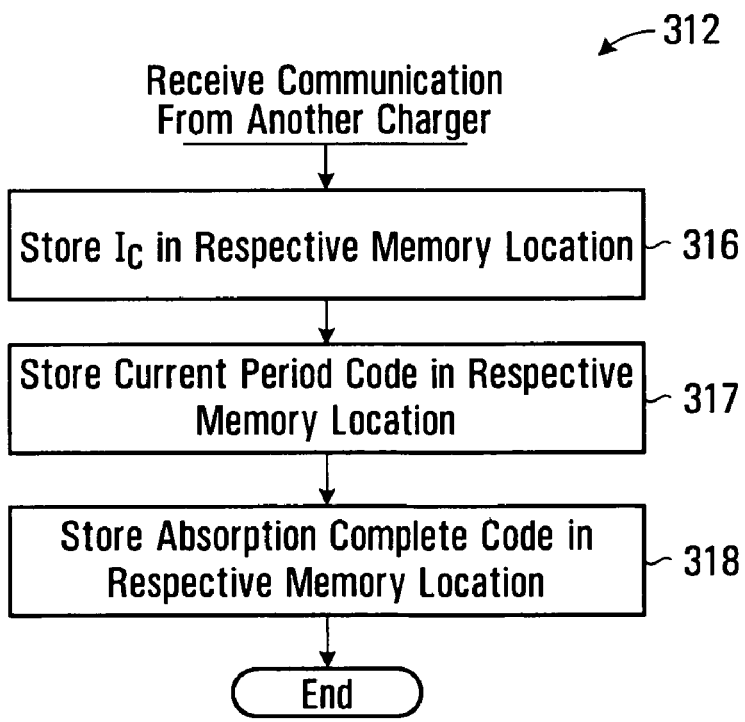
FIG. 17 is a flow chart of a communication interface for receiving communications from other chargers in the system shown in FIG. 14.

Still referring to FIG. 3, in a multiple charger and multiple inverter system, the program memory 36 is additionally configured with communications interfaces, the first of which is shown at 310 in FIG. 16 and the second of which is shown at 312 in FIG. 17.

Referring to FIGS. 3 and 16, the first additional communications interface 310 is invoked upon receiving a communication from any inverter in the common group. The first additional communication interface 310 is preferably invoked only in the primary charge controller of a common group, although other charge controllers in the common group may also receive communications from inverters in the common group. Upon receipt of a communication from an inverter in the common group, block 314 directs the processor 32 to store the received inverter current value $I_I$ in a store in the $I_I$ memory 112 that is associated with the inverter that sent the value. Thus, as inverters in a common group send their inverter current $I_I$ values to the primary charge controller of the common group, these values are stored in the $I_I$ memory 112 in the primary charge controller, in stores that are associated with the respective inverters from which the inverter current values are received.

Similarly, referring to FIGS. 3 and 17, the charge controllers of a common group are configured to receive communications from the other charge controllers in the common group, where these communications include current values $I_C$ representing current provided by respective other charge controllers in the common group, current period codes representing the current periods in the charging sequences of respective other charge controllers in the common group, and absorption period complete codes representing whether the absorption period has been completed for respective other charge controllers in the common group. Block 316 directs the processor 32 to store a received charge controller current value $I_C$ in a store in the $I_C$ memory 120 that is associated with the charge controller that sent the charge controller current value $I_C$. Also, block 317 directs the processor 32 to store a received current period code in a store in the current period memory 152 that is associated with the charge controller that sent the current period code. Furthermore, block 318 directs the processor 32 to store a received absorption complete code in a store in the absorption complete memory 338 that is associated with the charge controller that sent the absorption complete code.

In effect therefore, the primary charge controller in a common group receives and stores an inverter current value $I_I$ from each of the inverters in the common group, and each charge controller in the common group receives and stores charger current values $I_C$, current period codes, and absorption complete codes from each other charge controller in the common group.

Furthermore, in this embodiment, the charger current value $I_C$ associated with each charge controller is stored in the store of the $I_C$ memory 120 that is associated with that charge controller in a manner explained above and illustrated in FIG. 6, and the current period code and the absorption period code associated with each charge controller are stored in the stores of the current period memory 152 and the absorption complete memory 338 respectively that are associated with that charge controller in a manner illustrated below in FIG. 18. Otherwise, the functions of each charge controller (14) and inverter (16) are the same as described above, with the exception that the bulk period control process 78, absorption period control process 80, and float period control process 82 are replaced with a charge period control process 330 illustrated in FIG. 18.

Referring to FIGS. 3 and 18, the charge period control process 330 begins at 332 when the charge controller (14) is powered on. This may occur at the beginning of the day, for example, when the voltage and current available from the renewable energy source (12) meet certain minimum criteria. Thus, as soon as the charge controller (14) is powered on, block 334 directs the processor 32 to cause the bulk charging period to be in effect.

Block 334 is similar to blocks 150, 154, 158, and 160 illustrated in FIG. 8, and involves storing in the store of the current period memory 152 that is associated with the charge controller, a code representing that the current period of the charge cycle is the bulk charging period. As previously indicated, the current period memory 152 is illustrated in FIG. 3 as having a plurality of stores for respective charge controllers in a common group associated with the charge controller. The store in the current period memory 152 that is associated with the charge controller stores values that are established in the charge period control process 330, while the stores in the current period memory 152 that are associated with other charge controllers in the common group hold values that are set at block 317 as illustrated in FIG. 17. Block 334 also involves setting the contents of the reference voltage value $V_{Ref}$ memory 156 to zero, and storing in the $I_{CMax}$ memory 163 a value representing the lesser of the contents of the maximum power transfer point current value as represented by the contents of the $I_{MPPT}$ memory 144 and the maximum charge controller current value as represented by the contents of the $I_{Max}$ memory 162. Furthermore, where the charge controller is the primary charge controller of the common group as indicated by the code in memory 305, block 334 also directs the processor 32 to transmit the contents of the store of the current period memory 152 that is associated with the primary charge controller, and the reference voltage value stored in the $V_{Ref}$ memory 156, to the inverters in the common group.

The charge period control process 330 continues at block 336, which directs the processor 32 to clear the absorption complete flag in the store of the absorption complete memory 338 that is associated with the charge controller. The absorption complete flag is used in this embodiment to indicate when the absorption period has been completed, and block 336 clears this flag in order to initialize the flag.

The charge period control process 330 continues at block 340, which directs the processor 32 to retrieve values from the current period memory 152 to determine whether the absorption period is in effect for any of the charge controllers in the common group. If at block 340 the absorption period is not in effect for any of the charge controllers in the common group, the charge period control process 330 continues at block 342, which directs the processor 32 to determine whether the bulk period exit criterion has been met. In this embodiment, the bulk period exit criterion is met when the battery voltage value $V_B$ stored in the $V_B$ memory 118 is greater than or equal to the temperature compensated bulk period exit voltage value $V_{BulkExitT}$ stored in the $V_{BulkExitT}$ memory 101. If at block 342 the bulk period exit criterion is not met, then the charge period control process 330 continues at block 340 as described above.

But if at block 342 the bulk period exit criterion is met, then the charge period control process 330 continues at block 344, which directs the processor 32 to cause the absorption period to be in effect. Block 344 is similar to blocks 170, 172, 174, and 178 shown in FIG. 9, and involves starting a timer as described above in block 170 shown in FIG. 9, setting the contents of the store of the current period memory 152 that is associated with the charge controller to store a code representing that the current period in effect is the absorption period, setting the contents of the $I_{CMax}$ memory 163 to be the lesser of the contents of the maximum power point current $I_{MPPT}$ memory 144 and the maximum charge controller current $I_{Max}$ memory 162, and setting the contents of the reference voltage value $V_{Ref}$ memory 156 equal to the contents of the temperature compensated absorption voltage $V_{AbsT}$ memory 128.

The charge period control process 330 continues at block 346, which directs the processor 32 to determine whether the absorption period exit criteria are met. Block 346 generally includes codes corresponding to those beginning at block 176, and continuing as necessary at blocks 178, 180, 182, 186, 188, and 174, as illustrated in FIG. 9. However, in this embodiment, block 180 is executed only if the charge controller is a primary charge controller according to the code in the primary charge controller memory 305, and block 182 is modified to determine battery current $I_B$ as the difference between the sum of all of the charger current values stored in the $I_C$ memory 120, and the sum of all of the inverter current values from the $I_I$ memory 112, so as to determine the difference between the sum of all of the charger current values $I_C$ from all of the charge controllers in the common group, and the sum of all of the inverter current values $I_I$ from all of the inverters in the common group.

Thus, when the processor 32 determines at block 342 that the bulk period exit criterion is met, the charge controller causes the absorption period to be in effect. However, in this embodiment, when any charge controller in the common group causes the absorption period to be in effect, each charge controller in the common group will also cause the absorption period to be in effect. Therefore, if at block 340 the absorption period is in effect for at least one of the charge controllers in the common group, then the charge period control process 330 continues at block 348, which directs the processor 32 to determine whether the absorption period is in effect for the charge controller. If so, the charge period control process 330 continues at block 346 as described above. However, if at block 348 the absorption period is not already in effect for the charge controller, then the charge period control process 330 continues at block 344 as described above.

At block 346, the absorption period criteria are met in this embodiment when either the current $I_B$ in the memory 184 is less than or equal to an absorption exit current stored in the $I_{AbsExit}$ memory 106, or when the total time (t) in the absorption period is greater than or equal to the absorption period timeout value stored in the $T_{AbsTimeout}$ memory 108. If at block 346 the absorption period criteria are not met, then the processor 32 is directed back to block 346.

But if at block 346 the absorption period exit criteria are met, the charge period control process 330 continues at block 350, which directs the processor 32 to set the absorption complete flag in the store in the absorption complete memory 338 that is associated with the charge controller. In this embodiment, the absorption period remains in effect for all of the charge controllers in the common group until the absorption period exit criteria are met for all of the charge controllers in the common group. Therefore, the charge period control process 330 continues at block 352, which directs the processor 32 to access the codes in the absorption complete memory 338 to determine whether all of the charge controllers in the common group have set the absorption complete flag. If not, the charge period control process 330 returns to block 352.

However, if at block 352 all of the charge controllers in the common group have set the absorption complete flag, then the charge period control process 330 continues at block 354, which directs the processor (32) to cause the float period to be in effect. Block 354 generally involves executing the blocks illustrated in the float period control process 82 in FIG. 10.

Therefore, in summary, in a multiple charger and multiple inverter system, such as the system 280 illustrated in FIG. 14, the charge controllers cause the bulk charging period to be in effect, and then cause the absorption charging period to be in effect when the bulk period exit criterion has been met for at least one of the charge controllers in the common group. The absorption charging period remains in effect until the absorption period exit criteria have been met for all of the charge controllers in the common group, and the charge controllers in the common group then cause the float charging period to be in effect.

While specific embodiments of the invention have been described and illustrated, such embodiments should be considered illustrative of the invention as construed in accordance with the accompanying claims.

What is claimed is:

1. A method of charging a battery in a system comprising a renewable energy source and operable to supply at least some electrical energy from the renewable energy source to a third party, the method comprising:
   causing a charge controller operably connected to said renewable energy source to receive said electrical energy from said renewable energy source and operably connected to the battery, to charge the battery, using only said electrical energy from the renewable energy source, according to a charging sequence comprising at least:
   a bulk charge period wherein the battery is charged at a relatively constant charging current;

an absorption period following said bulk charge period wherein the battery is charged in an absorption mode; and a float period following said absorption period wherein the battery is charged in a float charging mode;

producing a charger current value representing current supplied by the charge controller;

producing a battery voltage value representing a battery voltage;

causing said charge controller to transmit an indication of the current period of said charging sequence and a reference voltage value associated with the current period of said charging sequence, to an inverter operably connected to the charge controller and the battery to receive electrical energy therefrom;

causing said inverter to draw current from the charge controller to supply electrical energy to the third party, without drawing sufficient current to load the charge controller to a point where said battery voltage value drops below a target voltage dependent on said reference voltage value, when said charge controller indicates said absorption period or said float period is in progress;

causing said charge controller to set said indication of the current period of said charging sequence to indicate that the current period of said charging sequence is the absorption period and causing said charge controller to set said reference voltage to correspond to an absorption voltage of said battery, when said battery voltage value meets a bulk charge exit criterion;

producing an inverter current value representing the current drawn by the inverter;

transmitting said inverter current value to said charge controller; and causing said charge controller to set said indication of the current period of said charging sequence to indicate that the current period of said charging sequence is the float period and causing said charge controller to set said reference voltage to correspond to a float voltage of said battery less than said absorption voltage of said battery, when said charger current value and said inverter current value meet absorption period exit criteria.

2. The method of claim 1 further comprising causing said inverter to draw no current from said charge controller when said bulk charge period is in progress.

3. The method of claim 1 further comprising producing said reference voltage value and producing said target voltage.

4. The method of claim 3 wherein producing said reference voltage value comprises producing a temperature-compensated manufacturer's recommended absorption voltage value in response to a temperature of the battery and a manufacturer's recommended absorption voltage value and using said temperature-compensated manufacturer's recommended absorption voltage value as said reference voltage value.

5. The method of claim 4 wherein producing said target voltage comprises producing a reduced temperature-compensated manufacturer's recommended absorption voltage value in response to said temperature-compensated manufacturer's recommended absorption voltage value and using said reduced temperature-compensated manufacturer's recommended absorption voltage value as said target voltage.

6. The method of claim 5 wherein producing said reduced temperature-compensated manufacturer's recommended absorption voltage value comprises subtracting about 1% to about 5% from said temperature-compensated manufacturer's recommended absorption voltage value.

7. The method of claim 3 wherein producing said reference voltage value comprises producing a temperature-compensated manufacturer's recommended float voltage value in response to a temperature of the battery and a manufacturer's recommended float voltage value and using said temperature-compensated manufacturer's recommended float voltage value as said reference voltage value.

8. The method of claim 7 wherein producing said target voltage comprises producing a reduced temperature-compensated manufacturer's recommended float voltage value in response to said temperature-compensated manufacturer's recommended float voltage value and using said reduced temperature-compensated manufacturer's recommended float voltage value as said target voltage.

9. The method of claim 8 wherein producing said reduced temperature-compensated manufacturer's recommended float voltage value comprises subtracting about 1% to about 5% from said temperature-compensated manufacturer's recommended float voltage value.

10. The method of claim 1 wherein said bulk charge exit criterion is met when said battery voltage value equals or exceeds a bulk period exit voltage value.

11. The method of claim 10 further comprising producing said bulk period exit voltage value.

12. The method of claim 11 wherein producing said bulk period exit voltage value comprises using a temperature compensated manufacturer's recommended absorption voltage value as said bulk period exit voltage value.

13. The method of claim 1 wherein said absorption period exit criteria are met when a difference between said charger current value and said inverter current value is less than an absorption current exit value or when said absorption period has been in progress for a time exceeding an absorption timeout value.

14. The method of claim 13 wherein said absorption current exit value is between 1% and 5% of an amp-hour rating of the battery.

15. The method of claim 1 wherein said charge controller and said inverter independently measure said battery voltage and produce respective battery voltage values for their respective uses.

16. The method of claim 1 wherein said charge controller includes a plurality of charge controllers in communication with each other and wherein one of said charge controllers of said plurality of charge controllers is a primary charge controller that is designated to be the only one that transmits said indication of the current period of said charging sequence and said reference voltage value to said inverter, in response to charger current values received from all charge controllers of said plurality of charge controllers and said inverter current value, received from said inverter.

17. The method of claim 1 wherein said inverter includes a plurality of inverters in communication with said charge controller, each inverter being operably connected to the charge controller and the battery to receive electrical energy therefrom and configured to:

draw no current from said charge controller when said bulk charge period is in progress;

draw current from the charge controller to supply electrical energy to the third party, without drawing sufficient current to load the charge controller to a point where said battery voltage value drops below said target voltage, when said charge controller indicates said absorption period or said float period is in progress;

produce an inverter current value representing the current drawn by the inverter; and transmit said inverter current value to said charge controller.

18. The method of claim 1 wherein said charge controller includes a plurality of charge controllers and said inverter includes a plurality of inverters, wherein said charge controllers are in communication with each other and with said inverters and wherein one of said charge controllers of said plurality of charge controllers is a primary charge controller, and wherein each inverter is operably connected to the charge controllers and the battery to receive electrical energy therefrom and wherein the method includes:
- causing said primary charge controller to be the only one that transmits said indication of said current period of said charging sequence and said reference voltage value;
- causing each inverter to:
  - draw no current from said plurality of charge controllers when said bulk charge period is in progress;
  - draw current from the plurality of charge controllers to supply electrical energy to the third party, without drawing sufficient current to load the charge controller to a point where said battery voltage value drops below said target voltage, when said primary charge controller indicates said absorption period or said float period is in progress;
  - produce an inverter current value representing the current drawn by the inverter; and
  - transmit said inverter current value to said primary charge controller;
- receiving said inverter current values at said primary charge controller;
- receiving at said primary charge controller charger current values from all of said plurality of charge controllers; and
- causing said primary charge controller to set said indication of the current period of said charging sequence to indicate that the current period of said charging sequence is the float period and to set said reference voltage value to correspond to a float voltage of said battery less than said absorption voltage of said battery, when said charger current values and said inverter current values meet absorption period exit criteria.

19. The method of claim 18 wherein said absorption period exit criteria are met when a difference between a sum of said charger current values and a sum of said inverter current values is less than an absorption current exit value or when said absorption period has been in progress for a time exceeding an absorption timeout value.

20. An apparatus for charging a battery in a system comprising a renewable energy source and operable to supply at least some electrical energy from the renewable energy source to a third party, the apparatus comprising:
- charging means for charging the battery, using only said electrical energy from the renewable energy source, according to a charging sequence, wherein said charging means is operably connected to said renewable energy source to receive said electrical energy from said renewable energy source and operably connected to the battery to charge the battery, and said charging sequence comprises at least:
  - a bulk charge period wherein the battery is charged at a relatively constant charging current;
  - an absorption period following said bulk charge period wherein the battery is charged in an absorption mode; and
  - a float period following said absorption period wherein the battery is charged in a float charging mode;
- means for producing a charger current value representing current supplied by the charging means to the battery;
- means for producing a battery voltage value representing a battery voltage; and
- receiving means operably connected to the charging means and the battery for receiving electrical energy therefrom;
- wherein said charging means is operably configured to transmit an indication of the current period of said charging sequence and a reference voltage value associated with the current period of said charging sequence, to said receiving means;
- wherein said receiving means is operably configured to:
  - receive current from said charging means to supply electrical energy to the third party, without drawing sufficient current to load the charging means to a point where said battery voltage value drops below a target voltage dependent on said reference voltage value, when said charging means indicates said absorption period or said float period is in progress; and
  - transmit to said charging means a received current value representing the current received by the receiving means; and
- wherein said charging means is operably configured to:
  - set said indication of the current period of said charging sequence to indicate that the current period of said charging sequence is the absorption period and to set said reference voltage to correspond to an absorption voltage of said battery, when said battery voltage value meets a bulk charge exit criterion; and
  - set said indication of the current period of said charging sequence to indicate that the current period of said charging sequence is the float period and to set said reference voltage to correspond to a float voltage of said battery less than said absorption voltage of said battery, when said charger current value and said received current value meet absorption period exit criteria.

21. The apparatus of claim 20 wherein said receiving means comprises a processor circuit operably configured to cause said receiving means to receive no current from said charging means when said bulk charge period is in progress.

22. The apparatus of claim 20 further comprising means for producing said reference voltage value and means for producing said target voltage.

23. The apparatus of claim 22 wherein said means for producing said reference voltage value comprises a first processor circuit operably configured to produce a temperature-compensated manufacturer's recommended absorption voltage value in response to a temperature of the battery and a manufacturer's recommended absorption voltage value, and to use said temperature-compensated manufacturer's recommended absorption voltage value as said reference voltage value.

24. The apparatus of claim 23 wherein said means for producing said target voltage comprises a second processor circuit operably configured to produce a reduced temperature-compensated manufacturer's recommended absorption voltage value in response to said temperature-compensated manufacturer's recommended absorption voltage value, and to use said reduced temperature-compensated manufacturer's recommended absorption voltage value as said target voltage.

25. The apparatus of claim 24 wherein said second processor circuit is operably configured to produce said reduced temperature-compensated manufacturer's recommended absorption voltage value by subtracting about 1% to about 5% from said temperature-compensated manufacturer's recommended absorption voltage value.

26. The apparatus of claim 22 wherein said means for producing said reference voltage value comprises a first processor circuit operably configured to produce a temperature-compensated manufacturer's recommended float voltage value in response to a temperature of the battery and a manufacturer's recommended float voltage value, and to use said temperature-compensated manufacturer's recommended float voltage value as said reference voltage value.

27. The apparatus of claim 26 wherein said means for producing said target voltage comprises a second processor circuit operably configured to produce a reduced temperature-compensated manufacturer's recommended float voltage value in response to said temperature-compensated manufacturer's recommended float voltage value, and to use said reduced temperature-compensated manufacturer's recommended float voltage value as said target voltage.

28. The apparatus of claim 27 wherein said second processor circuit is operably configured to produce said reduced temperature-compensated manufacturer's recommended float voltage value by subtracting about 1% to about 5% from said temperature-compensated manufacturer's recommended float voltage value.

29. The apparatus of claim 20 wherein said bulk charge exit criterion is met when said battery voltage value equals or exceeds a bulk period exit voltage value.

30. The apparatus of claim 29 further comprising means for producing said bulk period exit voltage value.

31. The apparatus of claim 30 wherein said means for producing said bulk period exit voltage value comprises a processor circuit operably configured to use a temperature compensated manufacturer's recommended absorption voltage value as said bulk period exit voltage value.

32. The apparatus of claim 20 wherein said absorption period exit criteria are met when a difference between said charger current value and said received current value is less than an absorption current exit value or when said absorption period has been in progress for a time exceeding an absorption timeout value.

33. The apparatus of claim 32 wherein said absorption current exit value is between 1% and 5% of an amp-hour rating of the battery.

34. The apparatus of claim 20 wherein said charging means and said receiving means independently measure said battery voltage and produce respective battery voltage values for their respective uses.

35. The apparatus of claim 20 wherein said charging means includes a plurality of charging means in communication with each other and wherein one of said charging means of said plurality of charging means is a primary charging means that is designated to be the only one that transmits said indication of the current period of said charging sequence and said reference voltage value to said receiving means, in response to charger current values received from all charging means of said plurality of charging means and said received current value, received from said receiving means.

36. The apparatus of claim 20 wherein said receiving means includes a plurality of receiving means in communication with said charging means, each receiving means being operably connected to the charging means and the battery to receive electrical energy therefrom and configured to:
receive no current from said charging means when said bulk charge period is in progress;
receive current from the charging means to supply electrical energy to the third party, without drawing sufficient current to load the charging means to a point where said battery voltage value drops below said target voltage, when said charging means indicates said absorption period or said float period is in progress;
produce a received current value representing the current drawn by the receiving means; and
transmit said received current value to said charging means.

37. The apparatus of claim 20 wherein said charging means includes a plurality of charging means and said receiving means includes a plurality of receiving means, wherein said plurality of charging means are in communication with each other and with said plurality of receiving means and wherein one of said charging means of said plurality of charging means is a primary charging means, and wherein each receiving means of said plurality of receiving means is operably connected to each charging means of said plurality of charging means and the battery to receive electrical energy therefrom and wherein:
said primary charging means is the only one that transmits said indication of said current period of said charging sequence and said reference voltage value;
each receiving means is operably configured to:
receive no current from said plurality of charging means when said bulk charge period is in progress;
receive current from the plurality of charging means to supply electrical energy to the third party, without drawing sufficient current to load the charging means to a point where said battery voltage value drops below said target voltage, when said primary charging means indicates said absorption period or said float period is in progress;
produce a received current value representing the current drawn by the receiving means; and
transmit said received current value to said primary charging means;
said primary charging means is operably configured to receive said received current values, and to receive charger current values from all of said plurality of charging means; and
said primary charging means is operably configured to set said indication of the current period of said charging sequence to indicate that the current period of said charging sequence is the float period and to set said reference voltage value to correspond to a float voltage of said battery less than said absorption voltage of said battery, when said charger current values and said received current values meet absorption period exit criteria.

38. The apparatus of claim 37 wherein said absorption period exit criteria are met when a difference between a sum of said charger current values and a sum of said received current values is less than an absorption current exit value or when said absorption period has been in progress for a time exceeding an absorption timeout value.

39. An apparatus for charging a battery in a system comprising a renewable energy source and operable to supply at least some electrical energy from the renewable energy source to a third party, the apparatus comprising:
a charge controller for charging the battery, using only said electrical energy from the renewable energy source, according to a charging sequence, wherein said charge controller is operably connected to said renewable energy source to receive said electrical energy from said renewable energy source and operably connected to the battery to charge the battery, and said charging sequence comprises at least:

a bulk charge period wherein the battery is charged at a relatively constant charging current;

an absorption period following said bulk charge period wherein the battery is charged in an absorption mode; and a float period following said absorption period wherein the battery is charged in a float charging mode;

a current measuring device in communication with said charge controller and operably configured to produce a charger current value representing current supplied by the charge controller to the battery;

a voltage measuring device in communication with said charge controller and operably configured to produce a battery voltage value representing a battery voltage; and an inverter operably connected to the charge controller and the battery for receiving electrical energy therefrom, and in communication with said charge controller and said voltage measuring device to receive said battery voltage value therefrom;

wherein said charge controller includes a first transmitter operably configured to transmit an indication of the current period of said charging sequence and a reference voltage value associated with the current period of said charging sequence, to said inverter;

wherein said inverter is operably configured to receive current from said charge controller to supply electrical energy to the third party, without drawing sufficient current to load the charge controller to a point where said battery voltage value drops below a target voltage dependent on said reference voltage value, when said charge controller indicates said absorption period or said float period is in progress;

wherein said inverter includes a second transmitter operably configured to transmit to said charge controller an inverter current value representing the current received by the inverter; and wherein said charge controller is operably configured to:
set said indication of the current period of said charging sequence to indicate that the current period of said charging sequence is the absorption period and to set said reference voltage to correspond to an absorption voltage of said battery, when said battery voltage value meets a bulk charge exit criterion; and set said indication of the current period of said charging sequence to indicate that the current period of said charging sequence is the float period and to set said reference voltage to correspond to a float voltage of said battery less than said absorption voltage of said battery, when said charger current value and said inverter current value meet absorption period exit criteria.

40. The apparatus of claim 39 wherein said inverter is operably configured to receive no current from said charge controller when said bulk charge period is in progress.

41. The apparatus of claim 39 wherein said charge controller comprises a first processor circuit operably configured to produce said reference voltage value, and wherein said inverter comprises a second processor circuit operably configured to produce said target voltage.

42. The apparatus of claim 41 wherein said first processor circuit is operably configured to produce a temperature-compensated manufacturer's recommended absorption voltage value in response to a temperature of the battery and a manufacturer's recommended absorption voltage value, and to use said temperature-compensated manufacturer's recommended absorption voltage value as said reference voltage value.

43. The apparatus of claim 42 wherein said second processor circuit is operably configured to produce a reduced temperature-compensated manufacturer's recommended absorption voltage value in response to said temperature-compensated manufacturer's recommended absorption voltage value, and to use said reduced temperature-compensated manufacturer's recommended absorption voltage value as said target voltage.

44. The apparatus of claim 43 wherein said second processor circuit is operably configured to produce said reduced temperature-compensated manufacturer's recommended absorption voltage value by subtracting about 1% to about 5% from said temperature-compensated manufacturer's recommended absorption voltage value.

45. The apparatus of claim 41 wherein said first processor circuit is operably configured to produce a temperature-compensated manufacturer's recommended float voltage value in response to a temperature of the battery and a manufacturer's recommended float voltage value, and to use said temperature-compensated manufacturer's recommended float voltage value as said reference voltage value.

46. The apparatus of claim 45 wherein said second processor circuit is operably configured to produce a reduced temperature-compensated manufacturer's recommended float voltage value in response to said temperature-compensated manufacturer's recommended float voltage value, and to use said reduced temperature-compensated manufacturer's recommended float voltage value as said target voltage.

47. The apparatus of claim 46 wherein said second processor circuit is operably configured to produce said reduced temperature-compensated manufacturer's recommended float voltage value by subtracting about 1% to about 5% from said temperature-compensated manufacturer's recommended float voltage value.

48. The apparatus of claim 39 wherein said bulk charge exit criterion is met when said battery voltage value equals or exceeds a bulk period exit voltage value.

49. The apparatus of claim 48 wherein said charge controller comprises a processor circuit operably configured to produce said bulk period exit voltage value.

50. The apparatus of claim 49 wherein said processor circuit is operably configured to use a temperature compensated manufacturer's recommended absorption voltage value as said bulk period exit voltage value.

51. The apparatus of claim 39 wherein said absorption period exit criteria are met when a difference between said charger current value and said inverter current value is less than an absorption current exit value or when said absorption period has been in progress for a time exceeding an absorption timeout value.

52. The apparatus of claim 51 wherein said absorption current exit value is between 1% and 5% of an amp-hour rating of the battery.

53. The apparatus of claim 39 wherein said charge controller and said inverter independently measure said battery voltage and produce respective battery voltage values for their respective uses.

54. The apparatus of claim 39 wherein said charge controller includes a plurality of charge controllers in communication with each other and wherein one of said charge controllers of said plurality of charge controllers is a primary charge controller that is designated to be the only one that transmits said indication of the current period of said charging sequence and said reference voltage value to said inverter, in response to charger current values received from all charge controllers of said plurality of charge controllers and said inverter current value, received from said inverter.

55. The apparatus of claim 39 wherein said inverter includes a plurality of inverters in communication with said charge controller, each inverter being operably connected to the charge controller and the battery to receive electrical energy therefrom and configured to:
  receive no current from said charge controller when said bulk charge period is in progress;
  receive current from the charge controller to supply electrical energy to the third party, without drawing sufficient current to load the charge controller to a point where said battery voltage value drops below said target voltage, when said charge controller indicates said absorption period or said float period is in progress;
  produce an inverter current value representing the current drawn by the inverter; and
  transmit said inverter current value to said charge controller.

56. The apparatus of claim 39 wherein said charge controller includes a plurality of charge controllers and said inverter includes a plurality of inverters, wherein said plurality of charge controllers are in communication with each other and with said plurality of inverters and wherein one of said charge controllers of said plurality of charge controllers is a primary charge controller, and wherein each inverter of said plurality of inverters is operably connected to each charge controller of said plurality of charge controllers and the battery to receive electrical energy therefrom and wherein:
  said primary charge controller is the only one that transmits said indication of said current period of said charging sequence and said reference voltage value;
  each inverter is operably configured to:
    receive no current from said plurality of charge controllers when said bulk charge period is in progress;
    receive current from the plurality of charge controllers to supply electrical energy to the third party, without drawing sufficient current to load the charge controller to a point where said battery voltage value drops below said target voltage, when said primary charge controller indicates said absorption period or said float period is in progress;
    produce an inverter current value representing the current drawn by the inverter; and
    transmit said inverter current value to said primary charge controller;
  said primary charge controller is operably configured to receive said inverter current values, and to receive charger current values from all of said plurality of charge controllers; and
  said primary charge controller is operably configured to set said indication of the current period of said charging sequence to indicate that the current period of said charging sequence is the float period and to set said reference voltage value to correspond to a float voltage of said battery less than said absorption voltage of said battery, when said charger current values and said inverter current values meet absorption period exit criteria.

57. The apparatus of claim 56 wherein said absorption period exit criteria are met when a difference between a sum of said charger current values and a sum of said inverter current values is less than an absorption current exit value or when said absorption period has been in progress for a time exceeding an absorption timeout value.

58. A method of charging at least one battery in a system comprising at least one renewable energy source and operable to supply at least some electrical energy from said at least one renewable energy source to a third party, the method comprising:
  associating charge controllers and inverters of said system into groups and associating said groups with at least one respective battery, wherein each group comprises at least one charge controller and at least one inverter, and wherein each said charge controller is operably connected to said renewable energy source to receive said electrical energy from said renewable energy source and operably connected to the at least one associated battery, to charge the at least one associated battery, using only said electrical energy from the renewable energy source, and wherein each said inverter is operably connected to at least one said charge controller in a same group and to the at least one associated battery to receive electrical energy therefrom;
  causing all of the charge controllers and inverters in each group to communicate with other charge controllers and inverters in the same group;
  causing one charge controller in the group to be identified as a group primary charge controller;
  causing each of said at least one charge controller in a common group to:
    produce a charger current value representing current supplied by that charge controller;
    produce a battery voltage value representing the voltage of said at least one battery associated with said common group; and
    transmit said charger current value and said battery voltage value to said group primary charge controller of said common group;
  causing said at least one charge controller in said common group to supply a battery charging current to said at least one battery associated with said common group, according to a charging sequence associated with said common group, said charging sequence comprising at least:
    a bulk charge period wherein said at least one battery associated with said common group is charged at a relatively constant charging current;
    an absorption period following said bulk charge period wherein said at least one battery associated with said common group is charged in an absorption charging mode; and
    a float period following said absorption period wherein said at least one battery associated with said common group is charged in a float charging mode;
  causing said group primary charge controller of said common group to transmit an indication of the current period of said charging sequence associated with said common group and a reference voltage associated with the current period of said charging sequence associated with said common group, to said at least one inverter in said common group;
  when said group primary charge controller of said common group indicates said absorption period or said float period is in effect, causing each of said at least one inverter in said common group to:
    measure a battery voltage value of said at least one battery associated with said common group;
    draw current from the at least one charge controller in said common group without drawing sufficient current to load the at least one charge controller of said common group to a point where said battery voltage value measured by that inverter drops below a target voltage dependent on said reference voltage associated with the current period of said charging sequence associated with said common group, wherein said current drawn from the at least one charge controller in said common group is provided to the third party;
measure the current drawn by that inverter; and
transmit to said group primary charge controller of said common group, an inverter current value representing current drawn by that inverter;

causing said group primary charge controller of said common group to set said indication of the current period of said charging sequence associated with said common group to indicate that the current period of said charging sequence associated with said common group is the absorption period;

causing said group primary charge controller of said common group to set said reference voltage associated with the current period of said charging sequence associated with said common group to correspond to an absorption voltage of said at least one battery associated with said common group, when at least one of said charge controllers in said common group transmits to said group primary charge controller of said common group a battery voltage value that meets a bulk period exit criterion; and causing said group primary charge controller of said common group to set said indication of the current period of said charging sequence associated with said common group to indicate that the current period of said charging sequence associated with said common group is the float period and causing said group primary charge controller of said common group to set said reference voltage associated with the current period of said charging sequence associated with said common group to correspond to a float voltage of said at least one battery associated with said common group, said float voltage of said at least one battery associated with said common group being less than said absorption voltage of said at least one battery associated with said common group, when said charger current values of said at least one charge controller of said common group and said inverter current values of said at least one inverter of said common group meet absorption period exit criteria.

59. The method of claim 58 further comprising, when said group primary charge controller of said common group indicates said bulk period is in effect, causing each of said at least one inverter in said common group to draw no current from said at least one charge controller in said common group.

60. The method of claim 58 wherein associating said charge controllers and said inverters of said system into groups comprises receiving programming values at each of said charge controllers and inverters, said programming values identifying the group with which respective charge controllers and inverters are to be associated.

* * * * *